(12) United States Patent
Shim et al.

(10) Patent No.: US 9,977,806 B2
(45) Date of Patent: May 22, 2018

(54) SYSTEM AND METHOD FOR SKYLINE QUERIES

(71) Applicants: SNU R&DB FOUNDATION, Seoul (KR); KOREA UNIVERSITY OF TECHNOLOGY AND EDUCATION INDUSTRY-UNIVERSITY COOPERATION FOUNDATION, Cheonan-si (KR)

(72) Inventors: Kyuseok Shim, Seoul (KR); Yoonjae Park, Seoul (KR); Jun-Ki Min, Daejeon (KR)

(73) Assignees: SNU R&DB Foundation, Seoul (KR); Korea University of Technology and Education Industry-University Cooperation Foundation, Cheonan-si (KR)

( * ) Notice: Subject to any disclaimer, the term of this patent is extended or adjusted under 35 U.S.C. 154(b) by 561 days.

(21) Appl. No.: 14/529,915

(22) Filed: Oct. 31, 2014

(65) Prior Publication Data
US 2015/0213125 A1    Jul. 30, 2015

(30) Foreign Application Priority Data
Jan. 28, 2014 (KR) ........................ 10-2014-0010288

(51) Int. Cl.
*G06F 7/00* (2006.01)
*G06F 17/30* (2006.01)
*G06F 15/16* (2006.01)

(52) U.S. Cl.
CPC .. *G06F 17/30327* (2013.01); *G06F 17/30241* (2013.01); *G06F 17/30477* (2013.01); *G06F 17/30522* (2013.01)

(58) Field of Classification Search
CPC ......... G06F 17/30522; G06F 17/30327; G01C 21/32
(Continued)

(56) References Cited

U.S. PATENT DOCUMENTS 8,166,042 B1\* 4/2012 Praun ................ G06F 17/30327
707/743
8,504,581 B2\* 8/2013 Bhattacharya .... G06F 17/30442
707/758
(Continued)

FOREIGN PATENT DOCUMENTS

KR     10-0976132 B1     8/2010

OTHER PUBLICATIONS

Liang Chen, Kai Hwang and Jian Wu. MapReduce Skyline Query Processing with a New Angular Partitioning Approach (IPDPS 2012). 2012 IEEE 26th International Parallel and Distributed Processing Symposium Workshops & PhD Forum. Mar. 21-25, 2012, Shanghai, China, pp. 2262-2270.*
(Continued)

*Primary Examiner* — Usmaan Saeed
*Assistant Examiner* — Brian E. Weinrich
(74) *Attorney, Agent, or Firm* — NSIP Law

(57) ABSTRACT

A skyline query is a query on a set of tuples which are not dominated by other tuples. The skyline query system includes a sky quad tree generator that generates a quad tree from data, and marks a leaf node, which cannot include a local skyline, as being dominated; a local skyline calculator that computes a local skyline of each leaf node, which is not marked as being dominated, in the sky quad tree; and a global skyline calculator that computes a global skyline by using the local skyline. A quad tree is a tree where each internal node has exactly four children. The skyline query is a query for calculating a skyline, a dynamic skyline, or a
(Continued)

reverse skyline from the data, where a dynamic skyline includes dynamic attributes and a reverse skyline identifies queries corresponding to certain skyline results.

18 Claims, 22 Drawing Sheets

(58) Field of Classification Search
USPC .......................................................... 707/741
See application file for complete search history.

(56) References Cited

U.S. PATENT DOCUMENTS

| | | | | |
|---|---|---|---|---|
| 8,825,640 | B2* | 9/2014 | Cormode | G06F 17/30286 707/723 |
| 9,009,177 | B2* | 4/2015 | Zheng | G06F 17/30241 707/758 |
| 2011/0084969 | A1* | 4/2011 | Park | G06F 17/30333 345/443 |
| 2011/0145244 | A1* | 6/2011 | Kim | G06F 17/30469 707/737 |
| 2013/0166586 | A1* | 6/2013 | Pfeifle | G01C 21/32 707/769 |

OTHER PUBLICATIONS

Yoonjae Park et al., "Parallel Computation of Skyline and Reverse Skyline Queries Using MapReduce", VLDB Endowment, vol. 6, Issue 14, Sep. 2013, pp. 2002-2013.

* cited by examiner

FIG. 1
| Laptop model code | Query = Light and low-priced laptop | | Query = laptop costing 500,000 won and weight around 1.5Kg | |
|---|---|---|---|---|
| | (Price (10 thousand won)) | Weight (Kg) | Price difference (10 thousand won) | Weight difference (Kg) |
| A | 40 | 2.0 | 10 | 0.5 |
| B | 60 | 2.5 | 10 | 1.0 |
| C | 70 | 1.0 | 20 | 0.5 |
FIG. 2A
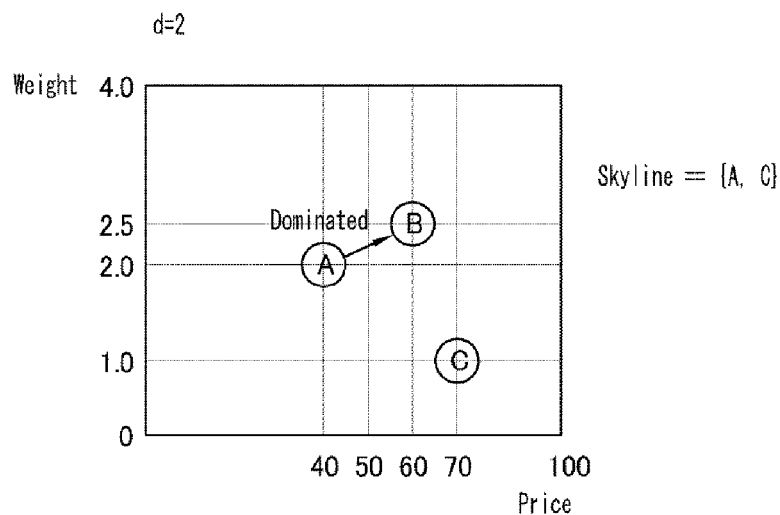
FIG. 2B
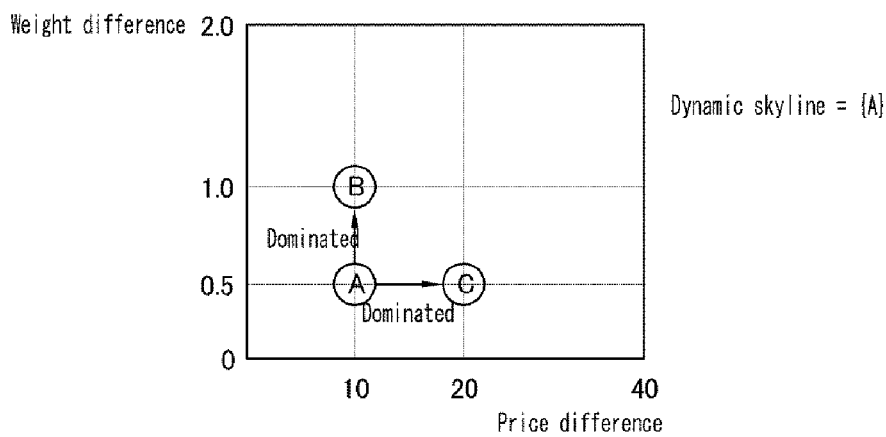

FIG. 3

| Laptop model code | Query = Laptop X costing 300,000 won and weighing 3.0Kg? | | | | Reverse skyline = {U1} |
|---|---|---|---|---|---|
| | Name of a urchaser | (Price (10 thousand won)) | Weight (Kg) | Dynamic skyline | |
| A | U1 | 40 | 2.0 | {B, X} | |
| B | U2 | 60 | 2.5 | {A, C} | |
| C | U3 | 70 | 1.0 | {A, B} | |

FIG. 4A

| | Input | Output |
|---|---|---|
| map | (k1,v1) | list(k2,v2) |
| reduce | (k2,list(v2)) | list(v2) |

FIG. 4B

```
map(String key, String value):
    // key: Document name
    // value: Document contents
    for each word w in value:
        EmitIntermediate(w, "1");

reduce(String key, Iterator values):
    // key: Each word
    // values: List of the number of words
    int result = 0;
    for each v in values:
        result += ParseInt(v);
```

FIG. 4C

| Key(Document name) | Values(Document contents) | Key(Each word) | Values(List of the number of words) |
|---|---|---|---|
| A | hello world | hello | 2 |
| B | hello | world | 2 |
| C | bye world | bye | 1 |

| 01 | 11 |
| --- | --- |
|  | ● 점1 |
| 00 | 10 |
|  | 점2 ● |

FIG. 8

| n | ID | | | | | | sub(n, 1) | sub(n, 2) | Marking dominance |
|---|---|---|---|---|---|---|---|---|---|
| | 1 | 2 | 3 | 4 | 5 | 6 | | d=2 | |
| 1 | 0 | 1 | 0 | 1 | | | 00 | 11 | |
| 2 | 0 | 1 | 1 | 0 | | | 01 | 10 | |
| 3 | 1 | 1 | | | | | 1 | 1 | Dominated |
| 4 | 1 | 0 | 0 | 0 | 0 | 1 | 100 | 001 | |
| 5 | 1 | 0 | 0 | 0 | 1 | 0 | 101 | 000 | |
| 6 | 1 | 0 | 1 | 1 | | | 11 | 01 | Dominated |

SYSTEM AND METHOD FOR SKYLINE QUERIES

CROSS-REFERENCE TO RELATED APPLICATION

This application claims the benefit of Korea Patent Application No. 10-2014-0010288 filed on Jan. 28, 2014, the entire disclosures of which are incorporated herein by reference.

TECHNICAL FIELD

The embodiments described herein pertain generally to a system and a method for skyline queries.

BACKGROUND

In recent, technologies relating to big data have been spotlighted. This is attributed to the circumstances that tremendous amounts of data are being globally accumulated with the growth of various types of electronic commerce or social networks, and utilizing more data enables higher quality analysis of data.

Of the technologies, a skyline query is a data analysis technique that can help decision making of users and companies.

For example, by analyzing data such as user's product purchase information, it is possible to recommend, to the user who intends to purchase a new product, his/her personalized product [ex]: utilizing a skyline query or a dynamic skyline query], or when a company makes a new product, it is possible to predict effects of the product [ex]: utilizing a reverse skyline query]. The skyline query, the dynamic skyline query, and the reverse skyline query are specifically described later with reference to FIG. 1 to FIG. 3.

For the foregoing reasons, it is desirable to utilize as many data as possible upon skyline calculation. However, conventional skyline calculation techniques cannot easily deal with the big data.

For example, in order to implement skyline calculation, various methods such as BNL, D&Q SFS, Bitmap, NN, and BBS have been proposed, but are problematic in that since they cannot accomplish parallelization using multiple computers, they require significantly long time for a big data or a significantly large memory space. In order to overcome the drawbacks, algorithms such as MRBNL and PPPS, which calculate skylines in parallel by using multiple computers or multi-core processors, have been suggested, but are still problematic in that they do not make the most of the parallelization in implementing the calculation.

Accordingly, an effective skyline query processing system and method, which can effectively process big data in parallel, are necessary. Also, a skyline query processing system and method, which can easily extend parallel processing for a skyline query to parallel processing for a dynamic skyline query or a reverse skyline query, are necessary.

With respect to the example embodiments, Korean Patent Registration No. 10-0976132 ("Method for Searching Personalized Top K Skylines by Using User Preference Information and a Computer Readable Record Medium thereof") describes searching top K skylines by determining priority between subset of qualitative preference of a user and a sky cube.

In addition, U.S. Pat. No. 8,504,581 B2 ("Multiple Criteria Decision Analysis") describes implementing skyline calculation based on join calculation of a relational database.

SUMMARY

In view of the foregoing, example embodiments provide an effective skyline query processing system and method, which can effectively process a skyline query, a dynamic skyline query, and a reverse skyline query in parallel for big data.

In one example embodiment, there is provided a skyline query system for implementing a skyline query. The skyline query system includes a sky quad tree generator that generates a quad tree from data, and marks a leaf node, which cannot include a local skyline, as being dominated; a local skyline calculator that computes a local skyline of each leaf node, which is not marked as being dominated, in the sky quad tree; and a global skyline calculator that computes a global skyline by using the local skyline. The skyline query is a query for calculating a skyline, a dynamic skyline, or a reverse skyline from the data, and each of the local skyline and the global skyline is a skyline, a dynamic skyline or a reverse skyline.

In another example embodiment, there is provided a method for implementing a skyline query by using a skyline query system constructed in a distributed environment. The method includes (a) generating a quad tree from data, and marking a leaf node, which cannot include a local skyline, as being dominated; (b) computing a local skyline of each leaf node, which is not marked as being dominated, in the sky quad tree; and (c) computing a global skyline by using the local skyline. The skyline query is a query for calculating a skyline, a dynamic skyline, or a reverse skyline from the data, and each of the local skyline and the global skyline is a skyline, a dynamic skyline or a reverse skyline.

In accordance with the example embodiments, there is an effect in providing an effective skyline query processing system and method, which can effectively process a skyline query, a dynamic skyline query, and a reverse skyline query in parallel for big data.

In accordance with the example embodiments, the skyline query system identifies a characteristic of distribution of data by using a quad tree, and distributes only data, which can be included in a skyline, according to the identified characteristic. In addition, unlike the conventional distribution processing algorithm that finally processes results, which have been processed in each of machines, in one machine, the example embodiments copy necessary partial data to eliminate the circumstance that calculations are concentrated in one machine. As such, the example embodiments can calculate skylines faster than the conventional technology. Furthermore, the example embodiments can effectively distribute and calculate a dynamic skyline and a reverse skyline, which could not have been resolved by other technologies, by changing a quad tree and making a slight change in a calculation method.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 1 illustrates examples for a skyline query, a dynamic skyline query, and a reverse skyline query;

FIG. 2A to FIG. 2B illustrate examples for a skyline query, a dynamic skyline query, and a reverse skyline query;

FIG. 3 illustrates an example for a reverse skyline query.

FIG. 4A to FIG. 4C illustrate an example for map-reduce functions;

FIG. 8 illustrates examples for a sky quad tree in accordance with an example embodiment;

DETAILED DESCRIPTION

Figure 5:
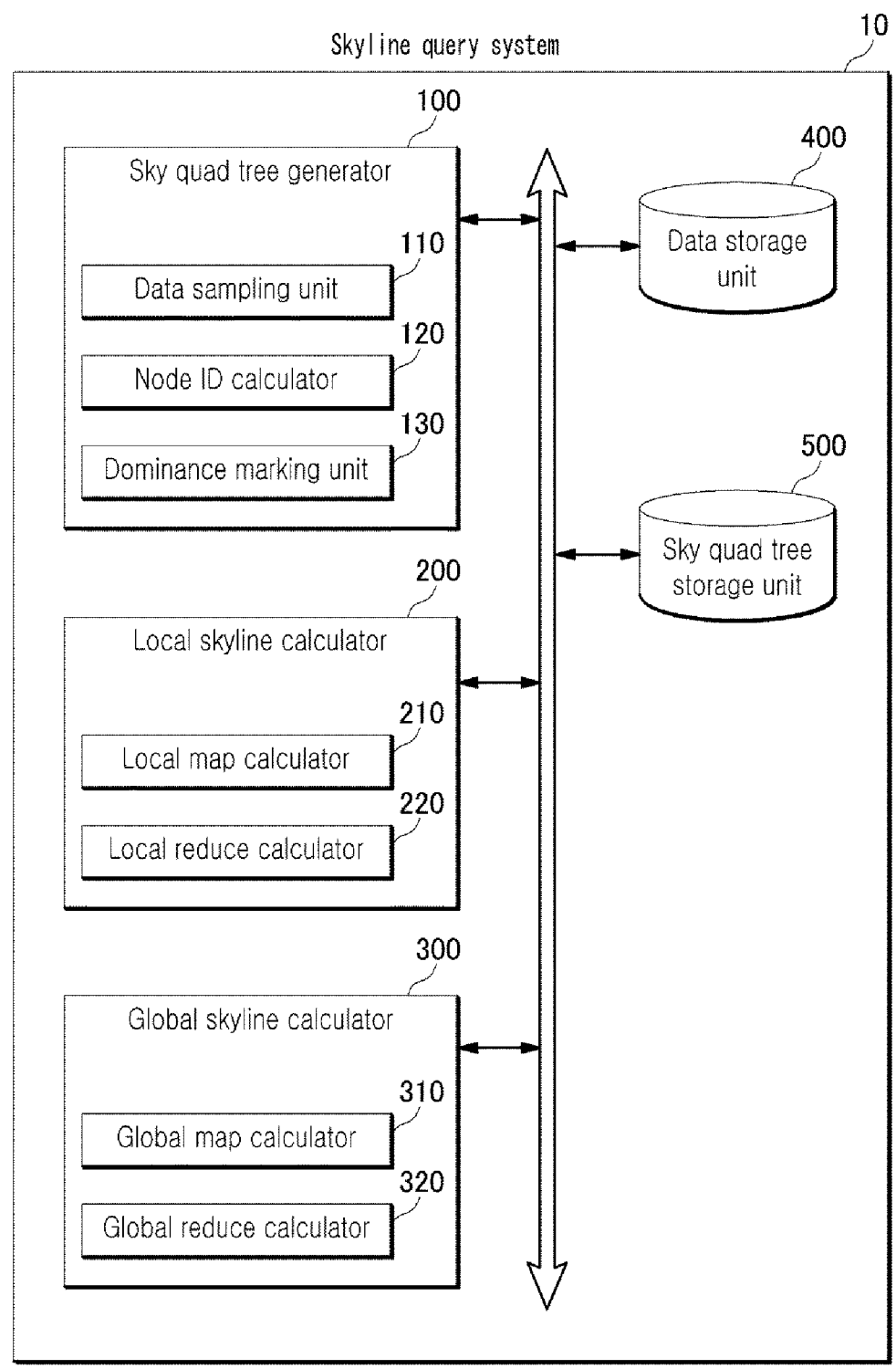
FIG. 5 illustrates a structure of a skyline query system in accordance with an example embodiment.

Hereinafter, example embodiments will be described in detail with reference to the accompanying drawings so that inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. In addition, the term "comprises or includes" and/or "comprising or including" used in the document means that one or more other components, steps, operations, and/or the existence or addition of elements are not excluded in addition to the described components, steps, operations and/or elements.

As described above, example embodiments provide an effective skyline query processing system and method, which can effectively process a skyline query, a dynamic skyline query, and a reverse skyline query in parallel for big data.

That is, example embodiments provide various types of skyline calculations to help decision making when a multiple number of criteria exist. Accordingly, the example embodiments can be applied to the following circumstances:

1) where each tuple has a multiple number of attributes;

2) where each tuple always has a value for each attribute; and 3) where the order of values for every attribute can be determined.

Detailed descriptions in this regard are provided below with reference to FIG. 1 to FIG. 3.

FIG. 1, FIG. 2A and FIG. 2B illustrate examples for a skyline query, a dynamic skyline query, and a reverse skyline query.

First, the skyline query is described with reference to FIG. 1, FIG. 2A and FIG. 2B.

Like the query illustrated in the left side of FIG. 1, there is the circumstance where a user wants to purchase a "low-priced and light laptop," and laptops A, B and C are available in the market.

Data for each of the laptops may be represented by a tuple having a model code, price and weight of the laptop as attributes and stored in a database table. For example, as illustrated, the laptop A may be stored as a tuple having a value of 40 as a price attribute, and a value of 2.0 as a weight attribute.

The illustrated example meets the above-described circumstances, to which the example embodiments can be applied. That is, each tuple contains a multiple number of attributes, which have values whose order can be determined compared to other tuples. These attributes indicate a multiple number of criteria contained in a decision making query. For example, the query has price and weight as decision making criteria, and in order to process the query, skyline calculation compares the tuples based on the price and weight attributes.

For example, since the laptop B is more expensive and heavier than the laptop A, the user would not consider the laptop B at all. Meanwhile, since the laptop C is more expensive while lighter than the laptop A, the user could not determine that the laptop C is poorer than the laptop A. Accordingly, the result of the skyline query is {A, C} excluding B.

Formal definition of the skyline is provided below.

When a union set of tuples is D, and a tuple p included in D is a point having a d-dimensional value, p can be represented by $<p(1), p(2), \ldots, p(d)>$. When two (2) tuples p and r are included in D, 1) if $p(k) \leq r(k)$ holds for every dimension k, and
2) if $p(j) < r(j)$ holds for at least one dimension j, it is said that the tuple p dominates the tuple r. The skyline of D means a set of all tuples, which are not dominated by any other tuples, and tuples included in the skyline are referred-to as skyline tuples.

In the illustrated example, since $p(1)=40 \leq r(1)=60$ and $p(2)=2.0 \leq r(2)=2.5$ hold, and $p(j) < r(j)$ holds for the case of j=1, the laptop A dominates the laptop B. Accordingly, the dominated laptop B is not included in the skyline according to the definition of the skyline. On the other hand, in the other possible combinations of the tuples, i.e., A and C, and B and C, any one tuple cannot dominate the other tuple. Accordingly, the skyline of D is a set of A and C, which have never been dominated.

FIG. 2A provides a graph showing the foregoing.

Since there are two (2) criteria that need to be considered by the user, namely, two (2) attributes that are used to compare the tuples, i.e., price and weight, the dimension of the graph is 2 (d=2). That is, FIG. 2A illustrates the tuples of the laptops A, B, and C by points in a 2-dimensional plane with an X axis for price and a Y axis for weight.

From the illustrated graph, it is identified that since A is closer to the query of the user than B with respect to both the X and Y axes, A is more preferable than B. That is, A is cheaper and lighter than B. Accordingly, A dominates B. On the other hand, in case of A and C, and B and C, since the tuple, which is close to the condition of the query with respect to the X axis, is distant from the condition of the query with respect to the Y axis, or vice versa, any one in each of A and C, and B and C cannot dominate the other one.

Accordingly, the skyline is {A, C} excluding the dominated tuple B.

Next, the dynamic skyline query is described with reference to FIG. 1 and the other drawing of FIG. 2A and FIG. 2B.

In the above-described skyline query, the preference of the user is queried by designating only the "low-priced and light" tendencies. However, in actuality, the user may want to purchase a product whose price is to a specific amount. For example, the user may want to purchase a "product whose price and weight are around 500,000 won and about 1.5 kg, respectively."

In this case, when the user requests a query of q=<500, 000 won, 1.5 kg>, which is his/her reference to a laptop, the domination concept may be redefined depending on a degree of approximation to the corresponding query. Given the query of $q=<q(1), q(2), \ldots, q(d)>$, if the two (2) tuples p and r included in the entire data D meet 1) $|p(k)-q(k)| \leq |r(k)-q(k)|$ for every dimension k, and
2) $|p(j)-q(j)| < |r(j)-q(j)|$ for at least one dimension j, it is said that p dynamically dominates r with respect to q. The dynamic skyline of D and q is a set of all tuples, which are not dynamically dominated by any other tuples with respect to q.

The dynamic skyline is the same in result as converting existing tuples into an absolute value of a difference of values for query points for every dimension, and then, implementing a skyline query for the converted data. Accordingly, for convenience, this document will use the domination and the dynamic domination together without clearly discriminating them, except for the case where the clear discrimination is necessary.

For example, price and weight differences between the laptop A and the laptop q wanted by the user are 100,000 won and 0.5 kg, respectively. Meanwhile, since a price difference between the laptop B and the laptop q is also 100,000 won, while a weight difference thereof is 1.0 kg, the laptop A dynamically dominates the laptop B with respect to the laptop q. Likewise, since price and weight differences between the laptop C and the laptop q is 200,000 won and 0.5 kg, respectively, the laptop C is also dynamically dominated by the laptop A. Accordingly, the dynamic skyline for D and q is {A}.

This dynamic skyline is the same as that resulting from calculating a skyline of data D" in the right side of the table of FIG. 1, which have been converted by using differences of the prices and the weights illustrated in the left side of the table of FIG. 1 from the query point.

FIG. 2B provides a graph in this regard.

Since there are two (2) criteria as in the first drawing, the tuples are illustrated by points in a 2-dimensional plane. The difference from the first drawing lies in that the attributes of each of the tuples are converted into and illustrated by differences from the attributes contained in the query.

Except for the conversion, determination of the dynamic domination is implemented in the same manner as determination of the domination. As shown in the drawing, since A has smaller differences from the attributes contained in the query than B and C with respect to both the X and Y axes, A dynamically dominates B and C (hereinafter, referred-to as dominance as aforementioned). Accordingly, the dynamic skyline set includes only the tuple A as illustrated.

FIG. 3 illustrates an example for a reverse skyline query.

The skyline described in FIG. 1, FIG. 2A and FIG. 2B was used as a method for picking out the product that the user wants in view of the user's position. A reverse skyline realizes that when companies develop a new product, they can predict how many people will purchase the product, based on various people's purchase lists.

The reverse skyline for laptop X is defined as a set of all tuples including laptop X in a dynamic skyline where a tuple contained in a database has itself as a query point. As shown above, for the user having a laptop preference q, if the dynamic skyline for q includes the laptop A, it means that the user considers the laptop A as a candidate to be purchased.

Accordingly, when a certain company manufactures laptop X as its new product, if it can be identified how many users include the laptop X in a dynamic skyline according to their preference, in other words, if a reverse skyline of the laptop X is calculated, it will be possible to identify the people who will consider the product as a candidate to be purchased and utilize such information for various marketing, etc., when the product is released.

For example, as illustrated in FIG. 3, if a company has data showing that users U1, U2 and U3 have purchased the laptops A, B and C of FIG. 1, respectively, the company can utilize the data set to determine marketing targets for its new product. In this case, since it is difficult to investigate and identify the users' actual preference to laptops, it is assumed that the users prefer to the prices and the weights of the laptops that they are currently using.

As the user U1 previously purchased the laptop A, U1's preference is 400,000 won and 2.0 kg. Based on the U1's preference, with respect to the laptop X that the company will release as its new product for the price of 300,000 won and the weight of 3.0 kg, price and weight differences between the laptops A and X are 100,000 won and 1.0 kg, respectively. On the other hand, since price and weight differences between the laptops B and X are 200,000 won and 0.5 kg, respectively, and price and weight differences between the laptops C and X are 300,000 won and 1.0 kg, respectively, the dynamic skyline according to the U1's preference is {B, X}. Accordingly, the user U1 will consider laptop X when purchasing a laptop. Likewise for analysis, the dynamic skylines of the users U2 and U3 are {A, C} and {A, B}, respectively, so that U2 and U3 will not consider the laptop X when purchasing a new laptop.

Accordingly, the reverse skyline of the laptop X is {U1}.

The skyline query, the dynamic skyline, and the reverse skyline query are calculations effectively used in various recommendation systems. As an amount of data used for calculation is large, more accurate recommendation can be provided. In actuality, the number of products being traded through the Internet is increasing with the development of the electronic commerce, and an amount of information showing people's actual purchase of products is geometrically increasing. Accordingly, an effective method for processing calculation in multiple computers, and not a single computer, is necessary.

However, as described above, the conventional technologies cannot effectively implement skyline queries for big data. The example embodiments use the MapReduce framework to effectively process big data in parallel.

FIG. 4A to FIG. 4C illustrate an example for map-reduce functions.

MapReduce published by Google is a framework for effectively supporting distribution computing. Although there are various realizations of the MapReduce framework, the realization of the open-source equivalent Hadoop is being widely used.

In the MapReduce framework, multiple computers (nodes) are connected to one another through a network to construct a large cluster. Data are represented in the form of a key-value pair consisting of a key and a value, and distributed and stored by a distributed file system in multiple computers.

The MapReduce framework takes an (input key, input value) pair to output an (output key, output value) pair, and a user has only to define a map function and a reduce function.

The map function takes an (input key, input value) pair to output a (mid key, mid value) list.

A MapReduce library groups identical mid keys and all mid values associated with the mid keys in a shuffling phase, to send the (mid key, mid value) list to the reduce function.

The reduce function receives the set of the mid keys and all the mid values associated with the mid keys, and merges the values to output (output key, output value), which is smaller than the corresponding set.

Accordingly, while the (input key, input value) and the (output key, output value) belong to different domains, the (mid key, mid value) and the (output key, output value) belong to the same domain.

That is, as illustrated in FIG. 4A, the map function takes one key-value pair (k1, v1) stored in the distributed file system as input and outputs several key-value pairs (list (k2, v2)). All the output key-value pairs are grouped into a list of values having the same key value as the key in the shuffling phase. The reduce function takes each distinct key value and a list of values sharing the key (k2, list (v2)) as input to output several key-value pairs (list (v2)) and store them once again in the distributed file system. One MapReduce work is finished when all reduce functions are completed, and another MapReduce work may be implemented by using output of a reduce function.

Works such as invoking a map function by using keys-values stored in the distributed file system or carrying out the shuffling phase to make a list of keys-values having the same key value are automatically processed in the MapReduce framework without intervention of a user. Accordingly, when the map and reduce functions take input, a user has only to decide which calculation will be implemented in each of the functions to output a key-value pair, and then, the MapReduce framework distributes and implements the calculation.

MapReduce provides various methods, in addition to the above-described method, and especially, a broadcast method, which is being frequently utilized. If there is information, which is commonly required by all map or reduce functions during implementation of MapReduce, the information is broadcasted before the map or reduce functions are started so that all the map or reduce functions have the same information, and the information can be used when the map or reduce functions implement calculations.

If the MapReduce framework is used, the distribution processing using multiple computers can be easily implemented in various occasions. FIG. 4B and FIG. 4C illustrate an example for counting the number of times of a word contained in a document.

A user wants to count a type of every word appearing in multiple documents stored in the distributed file system and the number of appearance times thereof. Data are stored as a key-value pair having a document name as a key and document contents as a value in the distributed file system.

To this end, as illustrated in FIG. 4B, the user has only to define a map function and a reduce function.

First, the map function takes a (document name, document content) pair as input, and outputs a key-value pair by setting each word contained in the corresponding document as a key and a value to the numeral 1. As a result, key-value pairs of (word, 1) are created. The number of key-value pairs where the key is a specific word, will be the number of appearance times of the corresponding word in the corresponding document.

The key-value pairs having the same key are grouped by the shuffling phase of the MapReduce framework and sent as input to the reduce function.

Accordingly, once the user defines the reduce function to count the number of the input key-value pairs and output them, the number of appearance times of the corresponding key, i.e., the corresponding word in all documents stored in the whole distributed file system can be identified. Thus, the reduce function outputs a key-value pair having the word as a key and the number of appearance times of the word as a value.

If this is applied to the example illustrated in FIG. 4C, three (3) map functions are first invoked with (A, "Hello World"), (B, "Hello"), (C, "Bye World") as input. The map function taking (A, "Hello World") as input divides the words to output ("Hello", 1), ("World", 1). Likewise, ("Hello", 1), and ("Bye", 1), ("World", 1) are output by the other two (2) map functions.

Next, in the shuffling phase, the MapReduce framework groups the key-value pairs output by the three (3) map functions into key-value pairs having the same key. That is, three (3) lists, (("Hello", 1), ("Hello", 1)), (("World", 1), ("World", 1)), and (("Bye", 1)) are output.

Since total three (3) different key values exist, three (3) reduce functions with their respective keys are invoked respective key-value lists as input. For example, since a reduce function invoked with (("Hello", 1), ("Hello", 1)) has total two (2) key-value pairs, it outputs ("Hello", 2), which implies that the word "Hello" appears twice.

When the other two (2) reduce functions are completed, the user can identify that "Hello" appears twice, "World" appears twice, and "Bye" appears once in documents A, B and C.

This operation may be implemented by a single computer, and is advantageous in that it can be handled in parallel by using multiple computers. A user has only to define map and reduce functions, and since all operations are automatically distributed and handled by the MapReduce framework, the MapReduce framework is appropriate for the goal of the example embodiments, which implement skyline calculation for a big data. The skyline query system in accordance with the example embodiments can effectively process the skyline query, the dynamic skyline query, and the reverse skyline query in parallel for big data.

The skyline query system and method in accordance with the example embodiments are briefly described with reference to FIG. 5 and FIG. 6, and detailed descriptions thereof are provided later. Prior to that, it should be noted that a conditional branch, which is not illustrated in the flow charts of the drawings in and after FIG. 6, may imply a branch directed toward finish of a corresponding phase.

FIG. 5 illustrates a structure of a skyline query system in accordance with an example embodiment.

A skyline query system 10 in accordance with an example embodiment includes a sky quad tree generator 100, a local skyline calculator 200, a global skyline calculator 300, a data storage unit 400, and a sky quad tree storage unit 500.

Although the drawing illustrates that a single computer includes all the above components, the skyline query system 10 in accordance with the example embodiment may be configured by a distributed system, which includes multiple computers connected with one another through at least one network. In addition, the skyline query system 10 in accordance with the example embodiment may operate in a distributed environment based on the MapReduce framework.

First, the data storage unit 400 stores data for implementing a skyline query. For example, laptop purchase data as in the above-described example may be stored in the form of a tuple containing multiple attributes having ordered values in the data storage unit 400. As described above, such multiple attributes indicate multiple criteria contained in a decision making query. The data for implementing a query may be distributed and stored in multiple nodes.

The sky quad tree storage unit 500 stores a sky quad tree, which is generated by the sky quad tree generator 100 and used by the local skyline calculator 200 and the global skyline calculator 300. Sky quad tree data may be distributed and stored in multiple nodes. The sky quad tree generator 100 may include a data sampling unit 110, a node ID calculator 120, and a dominance mark unit 130 in order to generate the sky quad tree based on the data stored in the data storage unit 400.

The local skyline calculator 200 computes a local skyline for tuples belonging to each leaf node of the sky quad tree, and the global skyline calculator 300 computes a global skyline as a final resulting product of the skyline query by using local skyline information.

In this regard, the local skyline calculator 200 may include a local map calculator 210 and a local reduce calculator 220, which implement map and reduce functions, respectively, in order to compute a local skyline and statistical information, and the local skyline calculator 300 may include a global map calculator 310 and a global reduce calculator 320, which implement map and reduce functions, respectively, in order to compute a global skyline.

Specific operation of each of the above-described components corresponds to each phase of the skyline query method, which is described in detail later. Each of the components can implement the corresponding phase of the skyline query method or the reverse skyline query method, which is described later, depending on a type of a query to be input. For example, the local map calculator 210 of the local skyline calculator 200 can implement a local map calculating phase (S210) or a reverse sky local map calculating phase (SR210) of a local skyline calculating phase (S220).

Accordingly, although specific operation of each of the components of the skyline query system 10 will be described in detail later with respect to each corresponding phase of the skyline query method, characteristic operation of each of the components is summarized below.

The skyline query system 10 includes a sky quad tree generator 100 that generates a quad tree from data and marks a leaf node, which cannot include a local skyline, as being dominated, a local skyline calculator 200 that computes a local skyline of each leaf node, which is not marked as being dominated, in the sky quad tree, and a global skyline calculator 300 that computes a global skyline by using the local skyline. In this case, the skyline query is a query for calculating a skyline, a dynamic skyline, or a reverse skyline from data, and each of the local skyline and the global skyline is a dynamic skyline or a reverse skyline.

The skyline query system 10 is a distributed system 10, which includes at least one computer node, and further includes at least one data storage unit 400 for storing data.

The skyline query system 10 processes a skyline query in parallel based on the MapReduce framework, and the local skyline calculator 200 and the global skyline calculator 300 compute a local skyline and a global skyline, by implementing map and reduce functions, to exclude data, which cannot be included in the local skyline and the global skyline.

The data include at least one attribute having ordered values, and the sky quad tree generator 100 determines a leaf node of the quad tree, to which the data will belong, by splitting a space, which has the number of the attributes of the data indicated by the criteria contained in the skyline query as a dimension, once or more according to location of points represented by the data in the space.

The sky quad tree generator 100 assigns a fixed ID to each of the split spaces for every space split according to location of each of the split spaces in the space prior to the split, and connects ID of the space prior to the split and ID of the split spaces to determine ID of a node of a quad tree represented by the split spaces. In this case, the sky quad tree generator 100 assigns a bit string, which has the same length as the dimension of the space, as ID of each of the split spaces. In addition, a leaf node of the quad tree includes data, which are smaller than or the same in number as a split threshold. In this case, the sky quad tree generator 100 may generate the quad tree by using only parts of the data.

If a skyline query is a query for calculating a reverse skyline, the sky quad tree generator 100 uses a midpoint between a point represented by the skyline query and a point represented by the data in the space when generating the quad tree. Also, if a skyline query is a query for calculating a reverse skyline, the sky quad tree generator 100 generates a quad tree for each of spaces divided based on a point represented by the skyline query.

Based on the ID of the nodes of the quad tree, the sky quad tree generator 100 determines a dominance relationship of the nodes. That is, the sky quad tree generator 100 determines whether a leaf node dominates another leaf node, by computing at least one bit string by dividing ID of a leaf node of the quad tree by dimensions, and comparing the bit string of the leaf node and the corresponding bit string of another leaf node.

The local skyline calculator 200 further computes statistical information that can be used in the global skyline calculator 300. That is, the local skyline calculator 200 further computes a virtual max point, which is virtual data constructed by using maximum values extracted in the data contained in the local skyline when compared with other data by attributes, and a skyfilter, which is a set of data where at least one attribute is a minimum value when compared with other data among the data contained in the local skyline.

Figure 6:
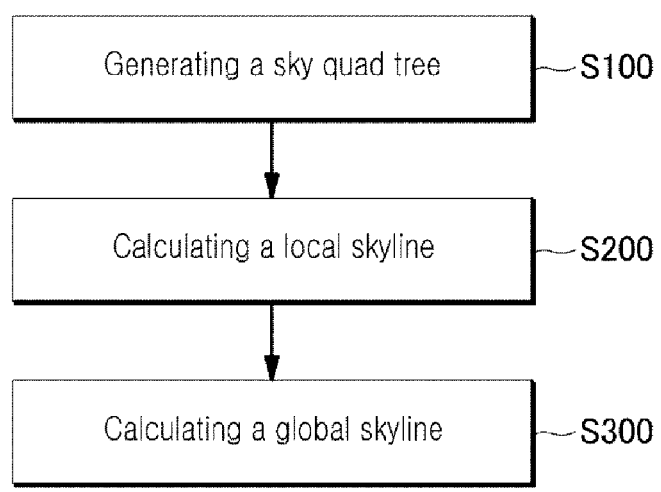
FIG. 6 illustrates flow of a skyline query method in accordance with an example embodiment.

FIG. 6 illustrates flow of a skyline query method in accordance with an example embodiment.

The skyline query method implemented by the skyline query system 10 in accordance with the example embodiment largely consists of three (3) phases as set forth below. Although detailed contents of each of the phases may slightly vary depending on which of a skyline query, a dynamic skyline query, and a reverse skyline query is implemented, the three (3) main phases of the skyline query method do not vary.

First, a sky quad tree, which is a material structure for utilizing schematic distribution information of data, is generated (S100). In this case, a leaf node, which cannot include a skyline, is marked as being dominated, and thereby, reducing a calculation amount in a next phase.

Next, a local skyline is computed (S200). That is, a skyline of tuples belonging to each leaf node of the sky quad tree, which can include a skyline, is calculated by using the MapReduce framework, and a virtual max point, and a skyfilter, etc., which represent a characteristic of a local skyline, are computed.

Next, a global skyline is computed (S300). That is, a skyline of the whole data that should have been originally calculated is computed by using the MapReduce framework though the local skyline, the virtual max point, and the skyfilter calculated in the previous phase.

Figure 7A:
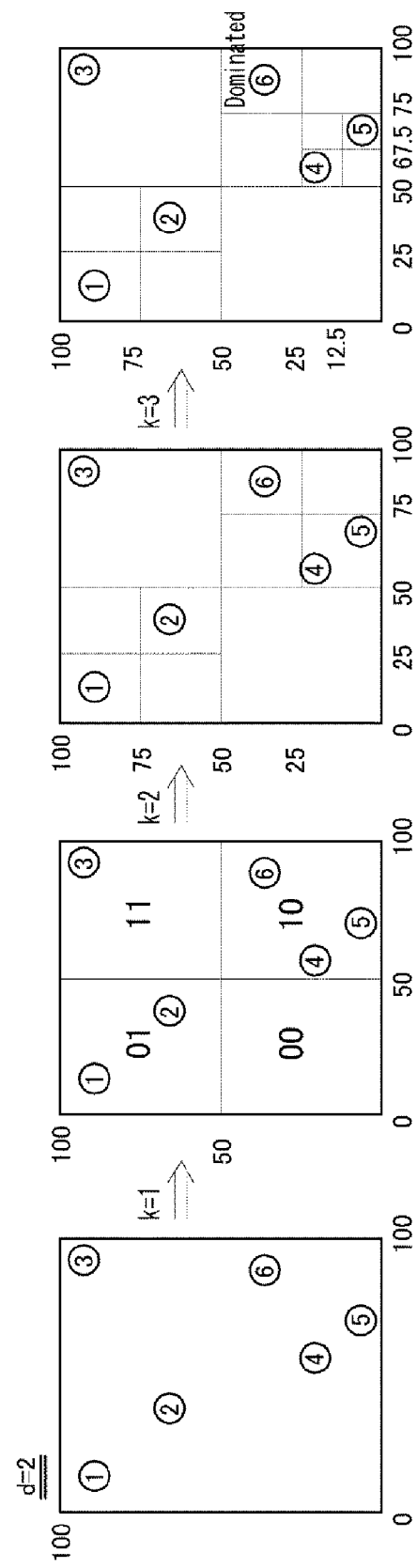
FIG. 7A to FIG. 7C illustrate examples for a sky quad tree in accordance with an example embodiment.

FIG. 7A to FIG. FC illustrate examples for a sky quad tree in accordance with an example embodiment.

The example embodiment uses a quad tree to effectively distribute data in multiple computers. Since the quad tree is used for a skyline query, it is referred-to as a sky quad tree in this document.

As indicated from the name of the quad, an internal node of the quad tree always has four (4) child nodes for 2-dimensional data. A root node (R) represents all spaces where data can be represented, and the four (4) child nodes represent spaces obtained from quadrisecting a space represented by a parent node, respectively.

The internal node has the child nodes only when the number of points contained in the space represented by the certain node is larger than a specific number of points, and the specific number of the points is called a split threshold. Accordingly, the number of points contained in a leaf node cannot exceed the split threshold. The quad tree can be extended when the number of dimensions is larger than 2, and each internal node has $2^d$ child nodes for d-dimensional data.

FIG. 7A illustrates a process for calculating the quad tree by setting the split threshold to 1 for 2-dimensional data (d=2). Each point may represent one tuple, as in the above-described example for purchase of a laptop, and representing points in the 2-dimensional space means that there are two (2) attributes of a skyline query, i.e., two (2) attributes of comparison criteria for decision making as in the above-described example for purchase of a laptop. Accordingly, as the number of attributes contained in the skyline query increases, the dimensions of the space will also increase.

In addition, for convenience in description, the split threshold has been set to 1 such that one split space includes one point. However, thereafter, by actually constructing the sky quad tree such that one space includes multiple points, among multiple points (tuple data) included in each of the split spaces (leaf nodes), a point included in a local skyline will be computed in the local skyline calculating phase.

Splitting the 2-dimensional space into four (4) spaces is the same as bisectioning each of the dimensions (the x axis direction and the y axis direction), and one skilled in the art could easily understand that the four (4) orthants can be represented by 00, 01, 10 and 11, respectively, by converting x and y values into 0 and 1, respectively.

That is, when a region is represented in the form of ([minimum of the x coordinate, maximum of the x coordinate], [minimum of the y coordinate, maximum of the y coordinate]), the root node represents a region of ([0, 100], [0, 100]). Since depth of the root node is 0, no ID exists. Since the child nodes of the root node have depth of 1 and are 2-dimensional data, they have two (2) bits as ID. This is 00, 01, 10 or 11 as indicated in the second drawing.

For example, the top left node indicates the region of ([0, 50], [50, 100]), and since the x dimension, which is the first dimension, is [0, 50], the node indicates the first half of the root node region ([0, 100]). Accordingly, the first bit of ID of the top left node is 0. On the other hand, since the y coordinate indicates [50, 100], which indicates the second half of the y coordinate region of the root node, the second bit of ID of the top left node is 1. Accordingly, ID of the top left node is 01. Likewise, it can be identified that ID of the bottom left node is 00, ID of the bottom right node is 10, and ID of the top right node is 11.

Accordingly, the entire space (root, depth is 0) in the first drawing of FIG. 7A can be split into four (4) spaces as shown in the second drawing of FIG. 7A, i.e., four (4) internal nodes with depth of 1 (k=1). If the split threshold is 3 or higher, the splitting is stopped at the second drawing of FIG. 7A where one orthant includes three (3) points. However, since the split threshold is 1, the space including 1 and 2 and the space including 4, 5 and 6 are split once more into four (4) spaces with depth of 2 (k=2) as shown in the third drawing of FIG. 7A. For the same reason, the space including 4 and 5 is split once more into four (4) spaces with depth of 3 (k=3) as shown in the fourth drawing of FIG. 7A, and the splitting is stopped since each of the spaces includes only one point, which is the same as the split threshold.

Figures 7B, 7C:
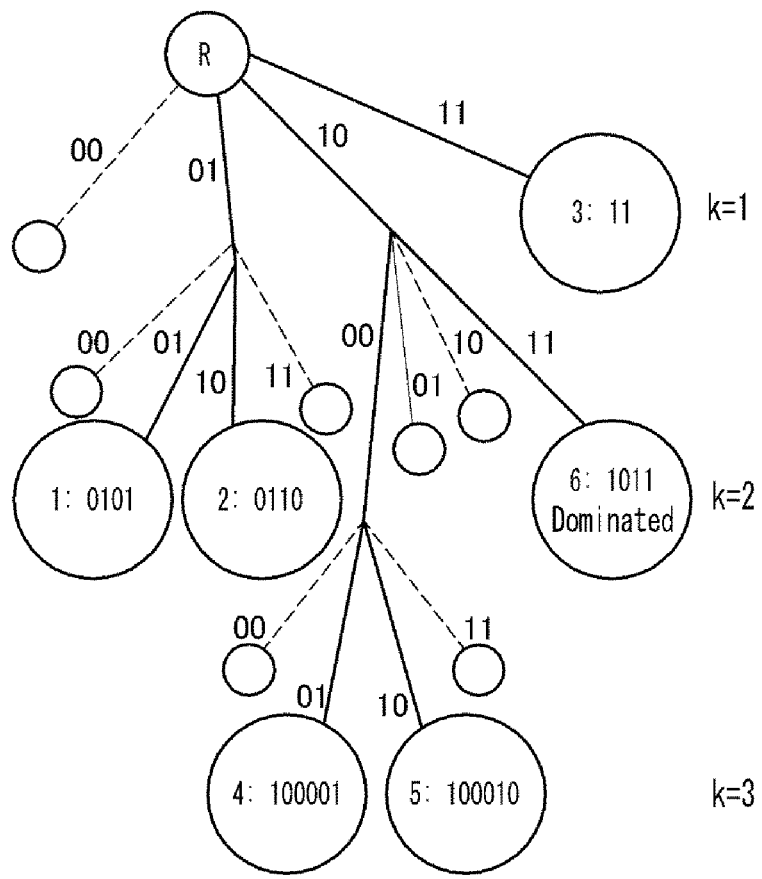

As a result, the quad tree starting from the root (R) and having depth of 3 is generated as illustrated in FIG. 7B. The points 1, 2, 3, 4, 5 and 6 of the 2-dimensional space are represented by six (6) leaf nodes. As illustrated in FIG. 7B, ID of the leaf nodes can be obtained by connecting 00, 01, 10 and 11 indicating the respective split spaces by turns. For example, since the point 3 is included in the orthant 11 in the second drawing, and the corresponding orthant has been no longer split, the leaf node including the point 3 can be identified by ID 11. In addition, since the point 5 is included in the orthant 10 of the first splitting, 01 of 10 of the second splitting, and 10 of 01 of 10 of the third splitting, the leaf node including the point 5 can be identified by ID 100110.

Meanwhile, depth (k) of a certain node in the tree structure means length of a route reaching from the root node to a node n. Accordingly, the root node has depth of 0, child nodes of the root node have depth of 1, and grandson nodes of the root node have depth of 2.

Thus, length of ID of each point, i.e., a leaf node of the sky quad tree is the same as a value obtained from multiplying a dimension and depth (d*k). For example, the ID of the leaf node including the point 3 has d*k=2*1=2 bits, and the ID of the leaf node including the point 5 is represented by d*k=2*3=6 bits.

That is, ID of a node n located in depth k in a d-dimensional space consists of k*d bits (0 or 1). k*(d−1) bits from the first bit are the same as ID of a parent node of the node n. Following k bits (i.e., ((k−1)*d+1, (k−1)*d+2, . . . , k*d)-th bits) mean relative location of the node n to the parent node in each dimension. The (k−1)*d+l-th bit has a value of 0 when the node n indicates the former part of the parent node in an i-th dimension, and a value of 1 when the node n indicates the latter part of the parent node.

The skyline query system 10 in accordance with the example embodiment uses the ID of the leaf nodes in the quad tree generated as described above to reduce a skyline calculation amount. That is, the sky quad tree in accordance with the example embodiment, which extends the quad tree concept, assigns ID by nodes as described above, so as to discriminate the nodes, easily compute the dominance relationship of the nodes, and excludes a leaf node, for which a local skyline needs to be calculated, in advance in the sky quad tree generating phase.

In other words, the advantage obtained from assigning ID to the sky quad tree as described above lies in that it is possible to mark the space, which cannot be a skyline, through simple bit calculation.

If it can be assured that a tuple included in a specific region cannot be included in a skyline, regardless of its location within the corresponding region, or to the contrary, if a certain tuple is included in the corresponding region, it can be identified that the tuple is not a skyline tuple. Accordingly, if the region, which cannot include a skyline, is marked in the leaf nodes of the sky quad tree, it can be quickly identified only from investigating the nodes of the sky quad tree, to which the tuple belongs, that the tuple is not included in the skyline.

To this end, it is necessary to identify which leaf node represents the region, which cannot include a skyline. The skyline query system 10 in accordance with the example embodiment can easily and quickly identify such a leaf node by comparing ID of the leaf nodes of the sky quad tree.

To compare ID of the nodes of the sky quad tree, several definitions are necessary. When a node n with depth k exists in a sky quad tree for a total d-dimensional space, k*d bits, which correspond to ID of the node n, may be divided into d bit strings. An i-th bit belongs to a (i−1)% k+1-th bit string, and is located in a floor(i−1/k)+1-th position of the bit string. Here, floor(x) means a floor value of x. The i-th bit string is referred-to as sub(n,i).

FIG. 8 shows sub(n,i) obtained for each of the leaf nodes of FIG. 7B.

For example, since ID of a leaf node having depth 2 and including the point 1 is 01 01 (separated by a space for convenience), sub(n,1) and sub(n,2) are 00 and 11, respectively. Likewise, since ID of a leaf node having depth 3 and including the point 5 is 10 01 10 (separated by spaces for convenience), sub(n,1) and sub(n,2) are 101 and 010, respectively.

For example, in case of three (3)-dimensional data, when ID of a node n with depth 5 is 010 011 100 100 101 (separated by spaces for convenience), it is divided into three (3) bit strings, i.e., 00111, 11000, 01001, which correspond to sub(n,1), sub(n,2), and sub(n,3), respectively.

Now, the relationship of the bit strings can be defined. In the example embodiment, given two (2) bit strings, i.e., $a=a\_1a\_2 \ldots a\_p$ and $b=b\_1b\_2 \ldots b\_q$, if $a\_i=b\_i$ holds for all $i=1, 2, \ldots, \min(p,q)$, this case is defined as $a=b$. It should be noted that all bits do not need to be the same to meet $a=b$. $a=b$ may hold only till bit strings with a short length from the first bit string, even though bit strings with a long length are the same.

Meanwhile, if there exists j, which meets $1 \leq j \leq \min(p,q)$, $a\_i=b\_i$ for all $i=1, 2, \ldots, j-1$, and $a\_j<b\_j$, this case is defined as $a<b$. Likewise, if there exists j, which meets $1 \leq j \leq \min(p,q)$, $a\_i=b\_i$ for all $i=1, 2, \ldots, j-1$, and $a\_j>b\_j$, this case is defined as $a>b$.

Now, the dominance relationship between two (2) nodes can be defined. When nodes n and m exist in the sky quad tree for a d-dimensional space, if sub(n,k)<sub(m,k) holds for all $1 \leq k \leq d$, it is defined that n dominates m. If the node m is dominated by another node n, and at least one point exists in the space represented by the node n, any point in the dominated node m cannot be included in a skyline. Accordingly, the skyline query system 10 in accordance with the example embodiment may mark the node dominated by the non-empty node to indicate that the node cannot include a skyline.

If there exists k, which meets sub(n,k)>sub(m,k) with respect to the nodes n and m, any tuple contained in n cannot dominate any tuple contained in m. In this case, it is said that "n does not dominate m." In other cases, except for the case where n "dominates" or "does not dominate" m, it is said that "n may dominate m."

For example, if there are a node n with ID of 1000 and a node m with ID of 101101 in the sky quad tree consisting of 2-dimensional data, sub(n,1) and sub(n,2) of the node n are 10 and 00, respectively, according to the definition. Likewise, it can be identified that sub(m,1) is 110, and sub(m,2) is 011. Upon comparing sub(n,1) and sub(m,1) (i.e., 10 and 110, respectively), the first positions are the same as 1, and the following positions are 0 and 1, respectively. Accordingly, in case of j=min(2, 3)=2, there exists j, which meets sub(n,1)_i=sub(m,1)_i and sub(n,1)_j<sub(m,1)_i for all i=1(=j−1), and thus, sub(n,1)<sub(m,1) holds. Likewise, (sub(n,2)=00)<(sub(m,2)=011) holds. Accordingly, since sub(n,k)<sub(m,k) holds for all $1 \leq k \leq d$ dominates m. If a point exists in n, m cannot include a skyline. Accordingly, the skyline query system 10 in accordance with the example embodiment may mark m to indicate that m cannot include a skyline so as to exclude unnecessary skyline calculation.

However, there is the case where even though n dominates m, m is not marked with "dominated." Upon comparing ID of nodes, the three (3) cases, i.e., "dominates," "does not dominate," and "may dominate" may be established, regardless of whether the nodes contain a point or not. However, the case where a leaf node of the sky quad tree is marked with "dominated" is actually limited to the case where other leaf nodes, which "dominate" the leaf node, include at least one leaf node containing a point. The limitation with respect to points contained in a leaf node marked with "dominated" is attributed to the purpose of comparing ID of nodes of the sky quad tree, which lies in reducing a calculation amount by skipping calculation for computing a skyline in later phases.

FIG. 8 illustrates examples for a sky quad tree in accordance with an example embodiment;

The drawings of FIG. 7A, FIG. 7B and FIG. 8 represent the dominance relationship. For example, since the node (i.e., 1011) containing the point 6 is dominated by another node containing at least one point, it is marked with "dominated." When comparing ID of the node containing the point 4 and the node containing the point 6, 100001, which is ID of the node containing the point 4, is split into sub(100001, 1)=100 and sub(100001, 2)=001, and 1011, which is ID of the node containing the point 6, is split into sub(1011, 1)=11 and sub(1011, 2)=01. First, when comparing sub(100001, 1) and sub(1011, 1), 100<11 holds, and thus, sub(100101, 1)<sub(1011,1) holds. Next, when comparing sub(100001, 2) and sub(1011, 2), 001<01 holds according to comparison based on bit strings having a short length, and thus, sub (100001, 2)<sub(1011,2) holds. Accordingly, since sub (100001,k)<sub(1011,k) holds for all 1≤k≤2, the node 100001 dominates the node 1011.

Accordingly, the node 1011 is marked with "dominated" to indicate that the node 1011 cannot include a skyline. Since one point contained in the node 1011 cannot be a skyline, the dominance relationship with other points is not determined in later phases. Accordingly, time for comparing the point in the node 1011 and other points can be saved.

That is, marking "dominated" in a node means that since the node does not surely include a skyline, the point contained in the node will not be considered when searching a skyline.

Accordingly, the skyline query system 10 in accordance with the example embodiment marks "dominated" only when sub(n,k)<sub(m,k) holds for all 1≤k≤d, and not when sub(n,k)≤sub(m,k) holds for all 1≤k≤d.

With reference to the last drawing of FIG. 7C, since skylines are the points 1 and 2, and sub(10,1)=1, sub(10,2)=0, sub(11,1)=1, and sub(11,2)=1 hold according to the definition, sub(10,1)=sub(11,1), and sub(10,2)<sub(11,2) hold. Accordingly, if sub(n,k)≤sub(m,k) holds, 11 is marked as being dominated.

Marking "dominated" in a node means that "all" points contained in the node are not surely skylines, but is contradictory since the point 1 contained in the node 11 is not dominated by the point 2. For this reason, the case of marking "dominated" is limited to the case where sub(n,k) <sub(m,k) holds for all 1≤k≤d.

In sum, the sky quad tree is a quad tree, which 1) assigns node ID, 2) marks a leaf node, which cannot include a skyline, to indicate that it cannot include a skyline. The whole process for making the sky quad tree is shown in FIG. 9.

Figure 9:
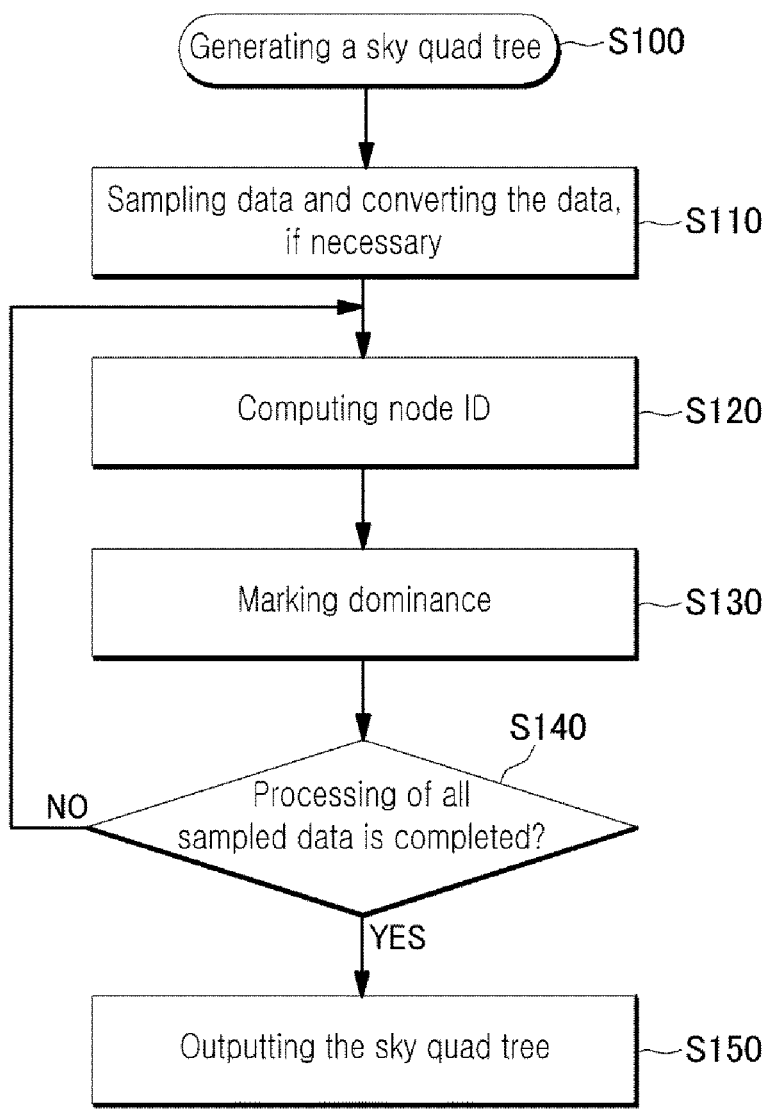
FIG. 9 illustrates flow of a sky quad tree generating phase in accordance with an example embodiment.

FIG. 9 illustrates flow of a sky quad tree generating process (S100).

Data are sampled (S110). Since the object of the example embodiment is to effectively calculate a skyline from big data, and making a sky quad tree by using all data stored in a distributed environment requires a large amount of costs, the skyline query system 10 in accordance with the example embodiment makes and utilizes a sky quad tree by using parts of data as samples, and not all data. Accordingly, the data sampling unit 110 of the sky quad tree generator 100 samples data stored in the data storage unit 400.

In this case, data may be converted, if necessary. As described later, the method for implementing a skyline query and the method for implementing a dynamic skyline query are slightly different from each other. As shown in the above-described example for purchase of a laptop, since the dynamic skyline query compares differences between data and values of attributes contained in the query, the skyline query system 10 in accordance with the example embodiment uses relative difference values between attributes of sampled data tuples and attributes included in the query with respect to the dynamic skyline query, while using attribute values of sampled data tuples with respect to the skyline query. Accordingly, the sky quad tree generator 100 may further implement the data conversion in the data sampling phase (S110).

Next, until all the sampled data are processed (S140), the sky quad tree is constructed, and a leaf node dominated by another leaf node is marked with "dominated."

That is, the node ID calculator 120 splits the space, to which the sampled data tuple belongs, such that each leaf node contains points, which are the split threshold or less in number, as described with reference to FIG. 7A to FIG. 8 and computes ID of each of the leaf nodes (S120).

Next, the dominance marking unit 130 splits the computed ID of each of the leaf nodes of the computed sky quad tree into partial strings and compares corresponding partial strings with one another to determine the dominance relationship as described with reference to FIG. 7A to FIG. 8, and then, marks dominance, if necessary (S130).

When generating the sky quad tree from the sampled data through the foregoing phases (S120, S130) is completed (S140), the sky quad tree is output (S150). The output sky quad tree may be stored in the sky quad tree storage unit 500 constructed in the distributed environment, and is used as input for a next phase (S200). However, the foregoing phases (S120, S130 and S140) do not mean individually processing the sampled data but mean a loop, along which the sky quad tree is generated.

Figure 10:
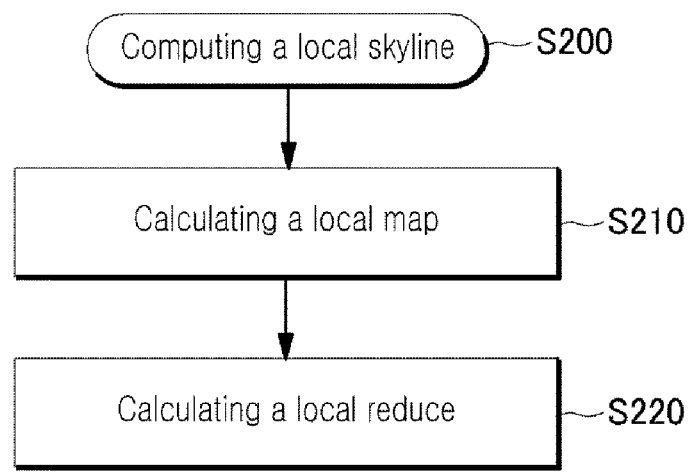
FIG. 10 illustrates flow of a local skyline computing phase in accordance with an example embodiment.
Figure 11:
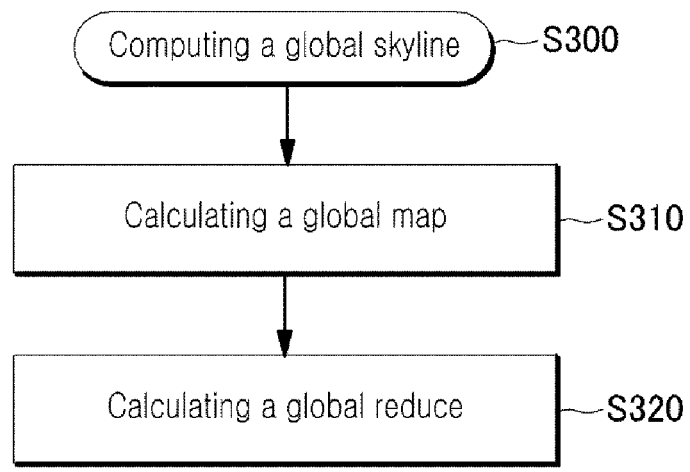
FIG. 11 illustrates flow of a global skyline computing phase in accordance with an example embodiment.

FIG. 10 illustrates flow of a local skyline calculating phase (S200) in accordance with an example embodiment, and FIG. 11 illustrates flow of a global skyline calculating phase (S300) in accordance with an example embodiment.

As illustrated, the local skyline computing phase (S200) includes a local map calculating phase (S210) and a local reduce calculating phase (S220), and the global skyline computing phase (S300) includes a global map calculating phase (S310) and a global reduce calculating phase (S320).

As indicated from the names of the phases, each of the phases can be realized through a map function and a reduce function of the MapReduce framework. That is, the local map calculating phase (S210) and the global map calculating phase (S310) may be implemented by at least one map function executed by the local map calculating unit 210 and the global map calculating unit 310 of at least one computer node of the distributed environment included in the sky query system 10 in accordance with the example embodiment, and the local reduce calculating phase (S220) and the global reduce calculating phase (S320) may be implemented by at least one reduce function executed by the local reduce calculator 220 and the global reduce calculator 320 of at least one computer node of the distributed environment included in the sky query system 10 in accordance with the example embodiment.

As described above, the skyline calculating method in accordance with the example embodiment slightly varies in specific phases with respect to implementing a skyline query, a dynamic skyline query, and a reverse skyline query, but does not vary in terms of the substantial phases that generates a skyline (S100), computes a local skyline (S200) through local map calculation (S210) and local reduce calculation (S220), and then, computes a global skyline (S300) through global map calculation (S310) and global reduce calculation (S320).

In addition, the method for implementing a skyline query and the method for implementing a dynamic skyline query are different from each other only in that data conversion is necessary for the dynamic skyline query as described above. Accordingly, since the dynamic skyline query can be implemented by the method for implementing a skyline query, each phase for implementing a skyline query will be first described, and then, differences from the dynamic skyline query will be described. Thereafter, the method for implementing a reverse skyline query will be described.

Figure 12:
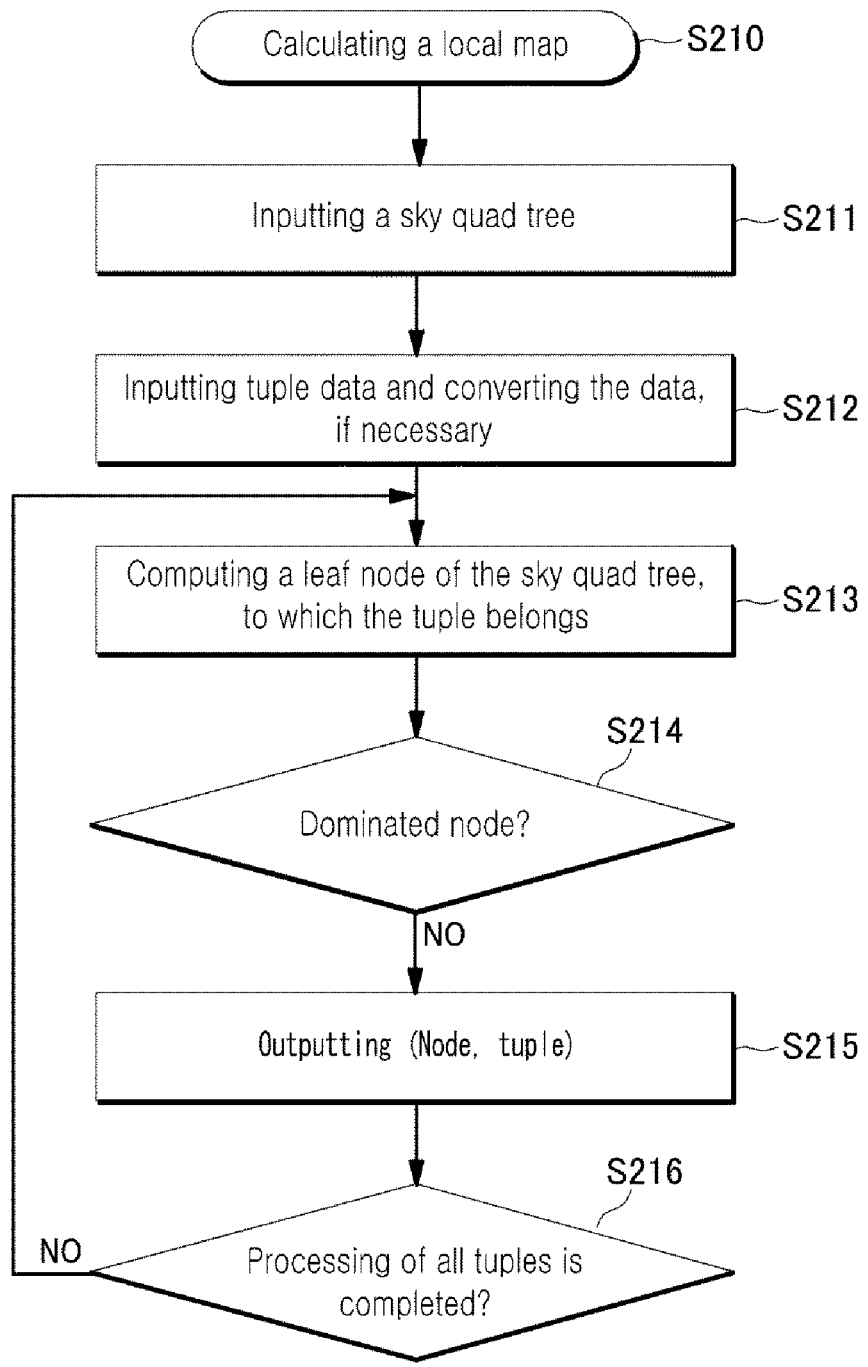
FIG. 12 illustrates flow of a local map calculating phase for a skyline query and a dynamic skyline query in accordance with an example embodiment.

FIG. 12 illustrates flow of a local map calculating phase (S210) for a skyline query and a dynamic skyline query in accordance with an example embodiment.

The sky quad tree is input (S211), and tuple data are input (S212). The input tuple data are converted, if necessary, namely, in case of a dynamic skyline query as described above.

A leaf node of the sky quad tree, to which the tuple belongs, is computed (S213).

Only when the leaf node is not a dominated node (S214), a (node, tuple) pair is output (S215).

As described above, the skyline query system 10 in accordance with the example embodiment generates the sky quad tree, and then, outputs a skyline for all data, i.e., a global skyline, through two (2) skyline calculating phases.

In the first skyline calculating phase (S200), a local skyline and additional information for quickly calculating a global skyline later are calculated, prior to calculation of a global skyline.

As described above, the skyline calculated by using only the tuple located in the region represented by the leaf node of the quad tree is referred-to as a local skyline of the leaf node. Since it is unnecessary to calculate a local skyline of the node, which is marked to indicate that it cannot include a skyline, among leaf nodes of the sky quad tree, it is sufficient to calculate only a local skyline of an unmarked node and additional information of the node.

In the local map calculating phase (S210) of the first skyline calculating phase (S200), the sky quad tree computed in the sky quad tree generating phase (S100) is broadcasted to at least one map function by the MapReduce framework (S211).

The map function takes each tuple t stored in a key-value form in the distributed file system as input (S212) and determines to which leaf node region of the sky quad tree the tuple belongs (S213). Only when the leaf node, to which the tuple t belongs, is not dominated by another non-empty leaf node (S214), a key-value pair having ID of the leaf node as a key and contents of the tuple t as a value is made and output. If the leaf node is dominated, the tuple t would be located in the space, which cannot be a skyline, and thus, the key-value pair is not output.

Figure 13:
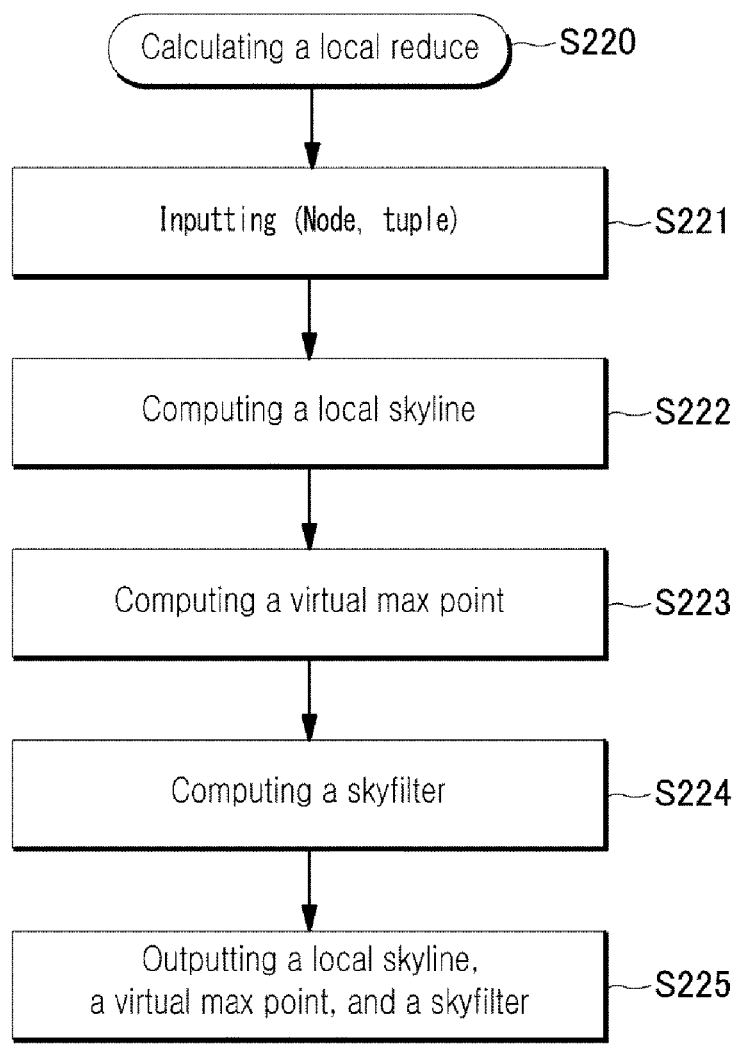
FIG. 13 illustrates flow of a local reduce calculating phase for a skyline query and a dynamic skyline query in accordance with an example embodiment.

FIG. 13 illustrates flow of a local reduce calculating phase (S220) for a skyline query and a dynamic skyline query in accordance with an example embodiment.

A (node, tuple) pair is input (S221), to compute a local skyline (S222).

A virtual max point and a skyfilter are computed (S223 and S224).

The computed local skyline, virtual max point, and skyfilter are output (S225).

The MapReduce framework, which is the base of the example embodiment, forms a list of keys-values having ID of non-dominated and non-empty leaf nodes of the sky quad tree as keys and invokes a reduce function for ID of each of the distinct leaf nodes, through a shuffling process, which is automatically executed between the local map calculating phase (S210) implemented by at least one first map function and the local reduce calculating phase (S220) implemented by at least one first reduce function (S221).

In this regard, to describe the flow of the local reduce calculating phase (S220) once again, when a leaf node to be input and processed in a reduce function is n, the reduce function calculates a local skyline in the list of all tuples included in the leaf node n (S222).

In addition, the reduce function (S220) generates statistical information of the calculated local skyline, in order to utilize the information for calculating a global skyline later (S223 and S224).

First, a virtual tuple, in which an attribute value for each dimension k is set to the largest value in k-dimensional attribute values of the tuples included in the local skyline, is made and called a virtual max point of the node n (S223).

Then, a set of local skyline tuples whose at least one attribute has a minimum value in the local skylines, is made and called a skyfilter of the node n (S224).

For example, if the local skyline of the node n is {(1,2,3), (2,3,2), (3,1,1), (2,2,2)}, the virtual max point is (3,2,3), and the skyfilter is {(1,2,3), (3,1,1)}.

The virtual max point and the skyfilter of the node n, which are generated as described above, are stored in the distributed file system (S225).

Figure 14:
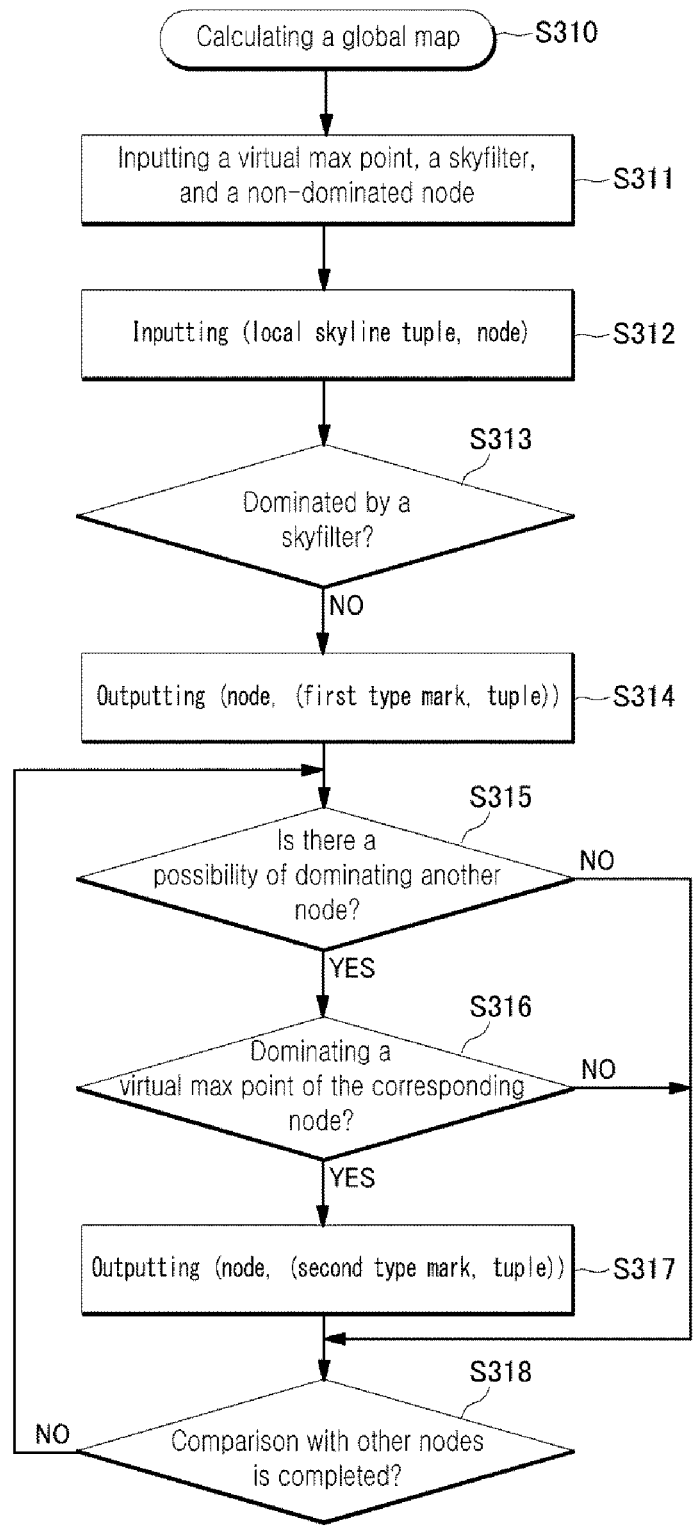
FIG. 14 illustrates flow of a global map calculating phase for a skyline query and a dynamic skyline query in accordance with an example embodiment.

FIG. 14 illustrates flow of a global map calculating phase (S310) for a skyline query and a dynamic skyline query in accordance with an example embodiment.

The virtual max point, the skyfilter, and the non-dominated node are input (S311), and a (local skyline tuple, node) pair is input (S312).

If the node is not dominated by the skyfilter (S313), a (node, (first type mark, tuple)) pair is output (S314).

If there is a possibility that the node dominates another node (S315), when the node dominates a virtual max point of the corresponding node (S316), a (node, (second type mark, tuple)) pair is output (S317).

Until comparison with other nodes is completed (S318), the foregoing phases (S314 to S317) are repeated.

In the second skyline calculating phase (S300), a final global skyline is computed based on the information computed in the first skyline calculating phase (S200). Specifically, all the local skylines computed in the local skyline computing phase (S200) include global skyline tuples, but since there is the case where several local skyline tuples are dominated by local skyline tuples of other nodes, such local skyline tuples are excluded from the global skyline computing phase (S300). In this case, in order to reduce unnecessary comparison calculation and data movement, the virtual max points and the skyfilters that have been calculated in the previous phase (S200) are utilized.

In this regard, to describe the flow of the global map calculating phase (S310) once again, the virtual max points, the skyfilters, and the ID of all the non-dominated nodes are broadcasted to map functions (S311). In addition, the map function takes, as input, a key-value pair, which has a tuple t constituting the local skyline output in the reduce function (S220) of the previous phase as a value and ID of a leaf node n including the tuple as a key (S312).

The map function determines whether the tuple t is dominated, by comparison with all the skyfilter tuples (S313). If there is the case where the tuple t is dominated, the local skyline tuple is not included in a global skyline, and thus, the map function is finished without outputting a key-value pair.

To the contrary, if the tuple t is not dominated by any of the skyfilter tuples, the map function outputs a key-value pair having ID of n as a key and ("+",t) as a value (S314). Here, "+" is a mark to indicate that the tuple is a tuple contained in the node n so as to be utilized in the next phase, and such a tuple is referred-to as Type 1. That is, "+" is a first type mark. The mark "+" is used for convenience, but marks other than "+" may be used as the first type mark.

Next, ID of the node n and ID of leaf nodes, which include tuples and are not dominated, are compared one by one. For convenience, when another comparable leaf node is m, if the node n "does not dominate" the node m upon comparison with the ID of the node m, a key-value pair is not output. Otherwise, it corresponds to the case where n "may dominate" m (S315).

If there is the possibility of the dominance as described above (S315), it is determined whether t dominates the virtual max point of m (S316). If the tuple t does not dominate the virtual max point of the node m, the key-value pair is not output.

If the tuple t dominates the virtual max point of the node m, a key-value pair having ID of m as a key and ("*",t) as a value is output. Here, the mark "*" indicates that the tuple t is not included in the region of m and is a local skyline tuple contained in a node other than m, and such a tuple is referred-to as Type 2. That is, "*" is a second type mark. The mark "*" is used for convenience, but marks other than "*" may be used as the second type mark. The tuple of Type 2 will be used in later phases to identify whether the local skyline tuple (Type 1 tuple) contained in the node m is a global skyline.

Figure 15:
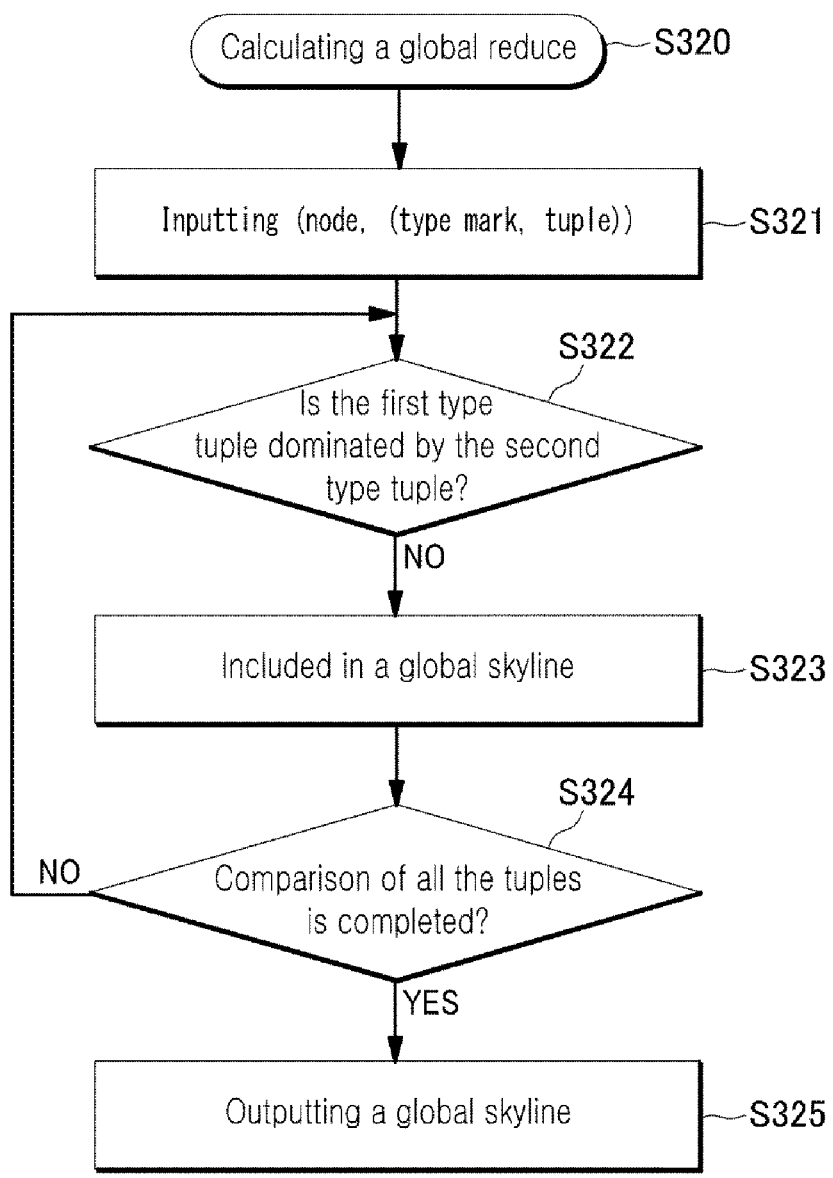
FIG. 15 illustrates flow of a global reduce calculating phase for a skyline query and a dynamic skyline query in accordance with an example embodiment.

FIG. 15 illustrates flow of a global reduce calculating phase (S320) for a skyline query and a dynamic skyline query in accordance with an example embodiment.

(Node, (type mark, tuple)) is input (S321).

If the first type tuple is not dominated by the second type tuple (S322), it is included in a global skyline (S323).

Once all the tuples are compared (S324), the global skyline is output (S325).

As in the local skyline computing phase (S200), the MapReduce framework, which is the base of the example embodiment, forms a list of keys-values having the same node ID, through a shuffling process, which is automatically executed between the global map calculating phase (S310) implemented by at least one second map function and the global reduce calculating phase (S320) implemented by at least one second reduce function.

This list includes two types of tuples, i.e., tuples of Type 1, which have not been removed by the skyfilter among the local skylines contained in the region of the node, and tuples of Type 2, which are not contained in the region of the node, while being necessary to determine whether the tuples of Type 1 are actually a global skyline.

In this regard, to describe the flow of the global reduce calculating phase (S320) once again, a reduce function is invoked per node ID after the finish of the shuffling process (S321). Since the map function has discriminated the tuples of Type 1 with the first type mark (+), and the tuples of Type 2 with the second type mark (*), the reduce function may also discriminate the tuples.

The reduce function determines whether there is the case where the tuples of Type 1 are dominated by the tuples of Type 2 (S322). If the tuple of Type 1 are dominated by at least one tuple of Type 2, the tuple of Type 1 is not included in the global skyline. If the tuple of Type 1 is not dominated by any of the tuples of Type 2, the tuple of Type 1 is included in the global skyline, and thus, the reduce function outputs the value of the tuple (S323).

Once the global skyline formed by all the output tuples (S324) is output (S325), the processing of the skyline query is completed.

The skyline query has been described. Hereinafter, it is described how a dynamic skyline query is different from the above-described skyline query.

As described above, the dynamic skyline is the same as calculating a skyline from data converted by using a difference between a given query point and an attribute value of each tuple. Accordingly, for the dynamic skyline query, a process for converting a query point is added.

First, the sky quad tree generating phase (S100) uses a tuple obtained from converting sampled data with respect to a query point (S110).

Thereafter, the local map calculating phase (S210) also further includes a process for converting the tuple into a tuple representing a distance with respect to the query point (S212). That is, for the dynamic skyline query, a tuple t', which is a difference between the input tuple t and a query point q, is used instead of the original tuple t.

Once the tuple is converted as described above, later calculation continuously uses the converted tuple, and thus, a dynamic skyline for a given query point can be calculated by identically using the above-described skyline query calculating method.

It has been reviewed that the dynamic skyline query is different from the skyline query only in that the dynamic skyline query adds the conversion of a data tuple to the sky quad tree generating phase and the local map calculating phase. Hereinafter, a reverse skyline query is described.

As described above, the reverse skyline query also is identical to the skyline query in terms of the main phases. Accordingly, each phase of the reverse skyline query method to be set forth below corresponds to each phase of the above-described skyline query. However, for convenience in description, R, which stands for reverse, is added to reference numerals for each phase of the reverse skyline query.

Figure 16:
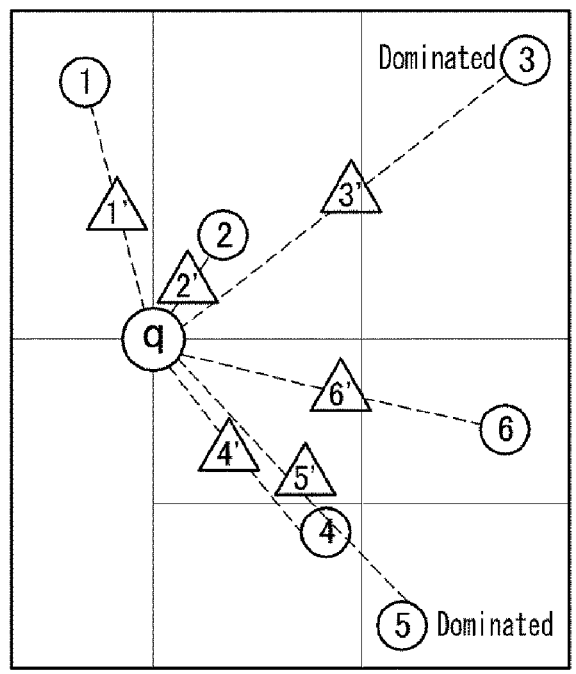
FIG. 16 illustrates an example for a reverse sky quad tree in accordance with an example embodiment.
Figure 17:
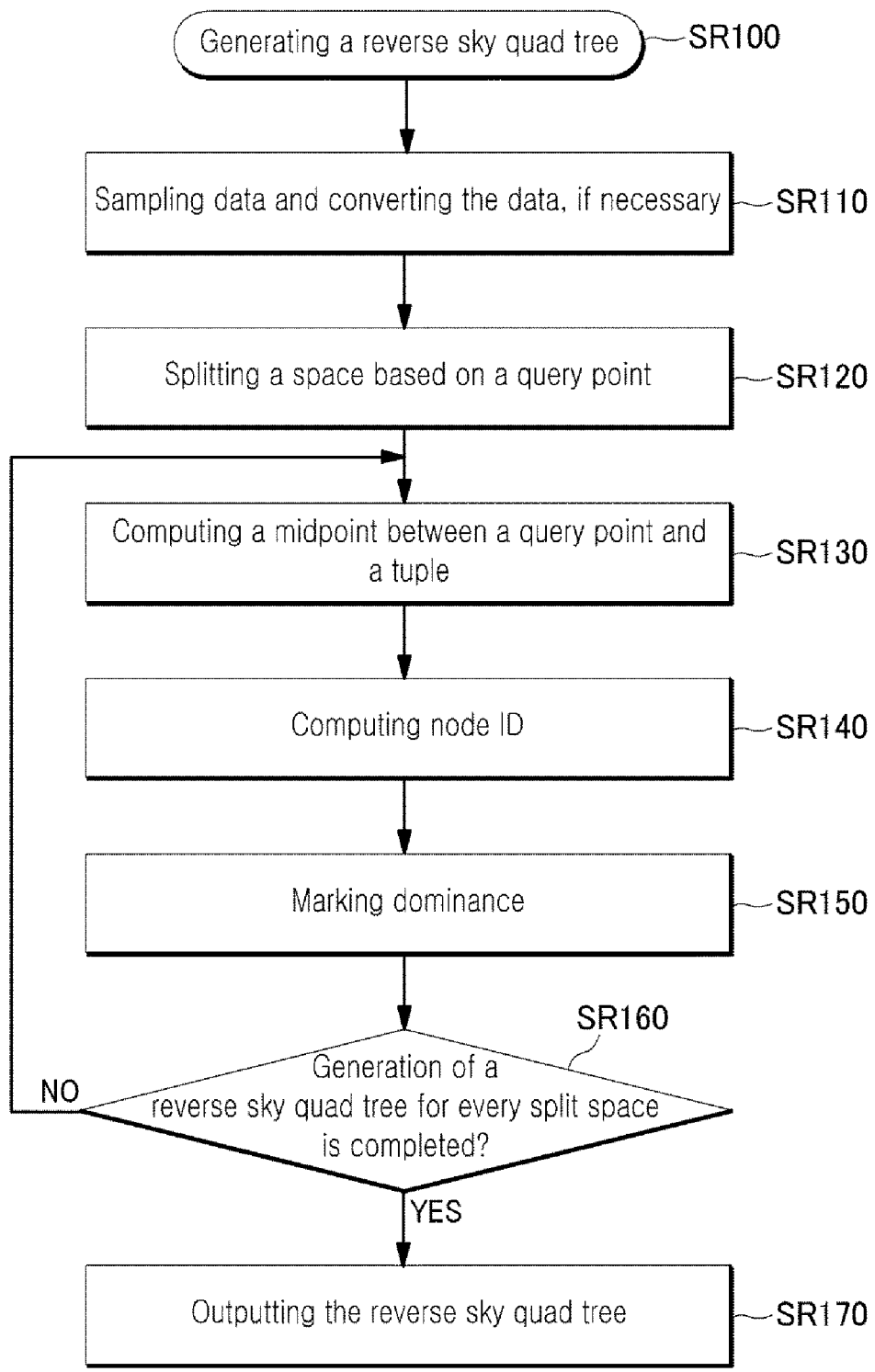
FIG. 17 illustrates flow of a reverse sky quad tree generating phase in accordance with an example embodiment.

FIG. 16 illustrates an example of a reverse sky quad tree in accordance with an example embodiment, and FIG. 17 illustrates flow of a reverse sky quad tree generating phase (SR100) in accordance with an example embodiment.

While the dynamic skyline can use the sky quad tree by converting tuples, the reverse skyline uses a reverse sky quad tree converted from the sky quad tree.

The sky quad tree and the reverse sky quad tree are different from each other in terms of the following three (3) points: 1) if d-dimensions exist, 2^d reverse sky quad trees are used depending on location of a given query point, 2) a midpoint between a query point and each point is utilized, and 3) a node dominated by two (2) or more midpoints is marked to indicate that the node cannot include a reverse skyline. That is, in case of processing a reverse skyline query, a node dominated by at least one point (data point, i.e., a point representing a tuple) or dynamically dominated by at least two (2) midpoints with respect to a query point q is marked with "dominated."

First, in case of d-dimensional data, if a query point is given, each of the dimensions is divided into a region having a value, which is the same or smaller than the query point, and a region having a value, which is the same or larger than the query point, so as to be split into total 2^d regions based on the query point. The region having the same value as the query point includes both the two (2) regions. A reverse skyline will be calculated for each of the regions, and a reverse sky quad tree will be generated for each of the regions.

FIG. 16 illustrates how the space will be split when a query point q is given. It can be seen that due to 2-dimensional data, the space is split into total four (4) orthant spaces. One reverse quad tree will be generated for each of the quadrant spaces, and accordingly, total four (4) reverse sky quad trees will be generated.

Next, a midpoint between a given query point q and a point present in the existing database is generated. The midpoint between the point p present in the database and the given query point q is simply referred-to as a midpoint of the point p. In the descriptions hereinafter, a point generated as a midpoint between a tuple and a query point is simply referred-to as a midpoint, or a midpoint-type tuple. The original tuple present in the database is referred-to as a tuple-type tuple to be discriminated from the midpoint-type tuple.

For example, in the example of FIG. 3 describing the reverse skyline query, a midpoint or a midpoint-type tuple between the query point (300,000 won, 3.0 kg) and the laptop A tuple (400,000 won, 2.0 kg) will be (350,000 won, 2.5 kg). FIG. 16 illustrates the midpoints in a triangle shape.

In the reverse sky quad tree, not only a point p but also a midpoint of the point p are generated, and the quad tree is generated including the midpoint as well. For example, in case of the reverse sky quad tree where the split threshold is 2, total four (4) points, which include midpoints, can be included in one region. Except for this point, the reverse sky quad tree has the same structure as the sky quad tree, and thus, illustration of the reverse sky quad tree is omitted.

Finally, in order to indicate that points contained in a node are not included in the reverse skyline, the node should be dominated by at least two (2) midpoints. If a midpoint m of a certain point in a d-dimensional space dynamically dominates all $2^d$ apexes of a region represented by a node n with respect to a query point, it is said that the midpoint m dominates the node n. If two (2) or more midpoints dominate the node n, it is marked that the points contained in the node n are not included in the reverse skyline.

For example, since the node 11 (illustrated as node 3 for convenience) in FIG. 16 is dynamically dominated by at least one (1) tuple and at least two (2) midpoints with respect to q, the node 11 is marked with "dominated," and since the node 100110 (illustrated as node 5 for convenience) is dynamically dominated by at least two (2) midpoints with respect to q, the node 100110 is marked with "dominated."

That is, the reverse sky quad tree generating phase (SR100) in accordance with the example embodiment has the flow set forth below.

As in the skyline query generating phase (S100), tuple data are sampled and converted, if necessary (SR110).

The space is split based on a query point (SR120). A reverse sky quad tree for each of the spaces will be generated. Accordingly, as described above, $2^d$ quad trees are generated.

A midpoint between the query point and the tuple is computed (SR130).

As in the skyline query generating phase (S100), node ID is computed (SR140), and dominance is marked (SR150). In this case, the reverse skyline query generating phase is slightly different from the skyline query generating phase (S100) in that the reverse skyline query generating phase further uses midpoints and determines the dominance based on whether a node is dominated by two (2) or more midpoints.

When the generation of the reverse sky quad tree for all the split spaces is completed (SR160), the generated reverse sky quad tree is output (SR170).

Figure 18:
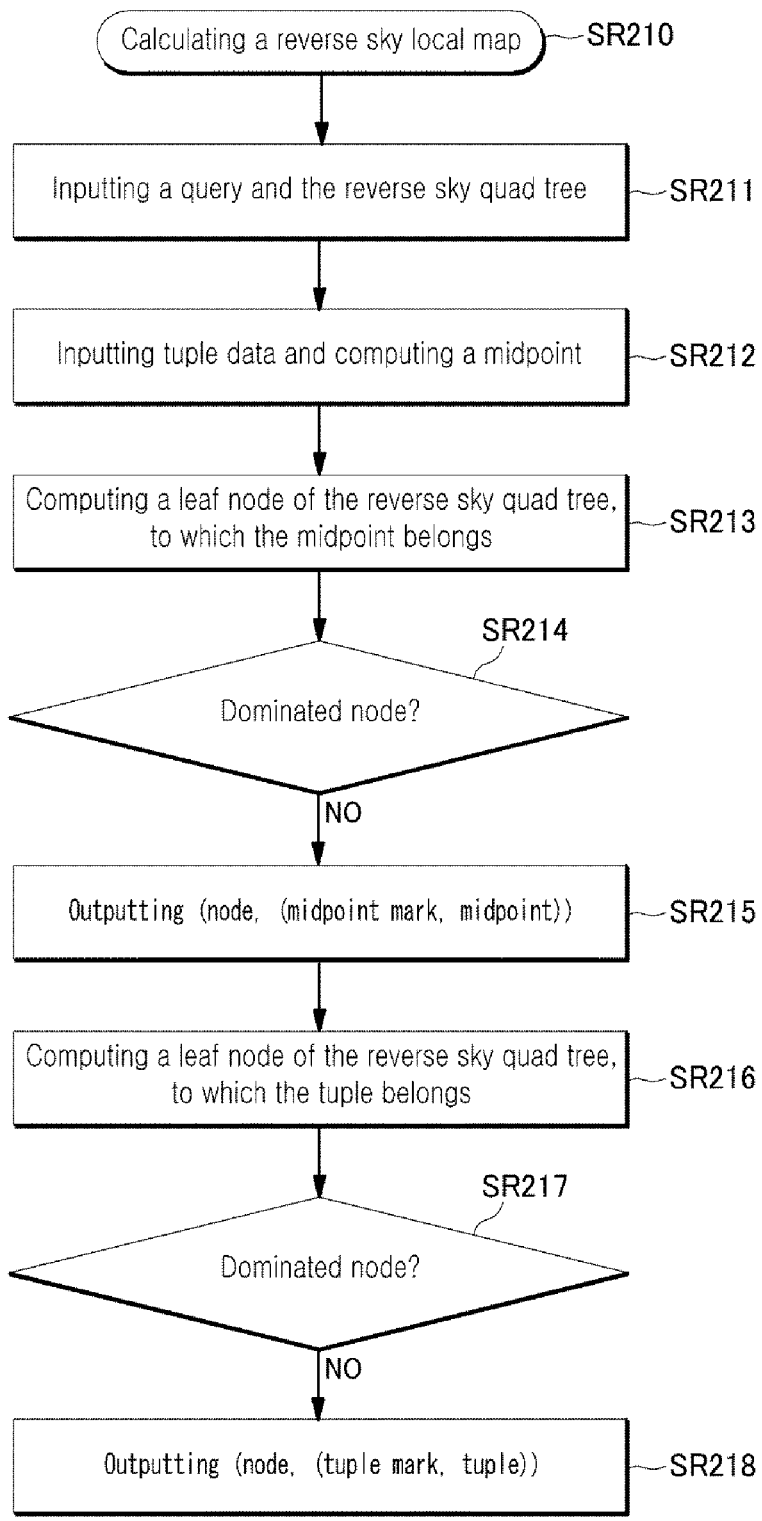
FIG. 18 illustrates flow of a local map calculating phase for a reverse skyline query in accordance with an example embodiment.

FIG. 18 illustrates flow of a local map calculating phase (SR210) for a reverse skyline query in accordance with an example embodiment.

A query and a reverse sky quad tree are input (SR211).

Tuple data are input, and a midpoint between a tuple point and a query point is computed (SR212).

Next, after a leaf node of the reverse sky quad tree, to which the midpoint belongs, is computed (SR213), it is determined whether the corresponding leaf node is a dominated node (SR214). If the leaf node is a dominated node, the local map calculating phase (SR210) is finished.

If the leaf node is a non-dominated node, (node, (midpoint mark, midpoint)) is output (SR215).

Next, after a leaf node of the reverse sky quad tree, to which a tuple belongs, is computed (SR216), it is determined whether the corresponding leaf node is a dominated node (SR217). If the leaf node is a dominated node, the local map calculating phase (SR210) is finished.

If the leaf node is a non-dominated node, (node, (tuple mark, tuple)) is output (SR218).

The reverse skyline also first calculates a local reverse skyline with only points contained in a leaf node, calculates a global reverse skyline through the calculated local reverse skyline, and utilizes the MapReduce framework.

In this regard, to describe the flow of the local map calculating phase (SR210) once again, the query point q of the reverse skyline and the reverse sky quad trees that have been calculated above are broadcasted to all map functions (SR211). In addition, the map function takes a tuple t as input, and calculates a midpoint m between t and the query point q (SR212).

Next, in the orthant quad tree, to which the midpoint m for the query point q belongs, a leaf node representing a region, to which m belongs, is searched (SR213), and only if the node is not dominated (SR214), ID of the leaf node and ("M", contents of the midpoint m) are output as a key and a value, respectively (SR215). If the leaf node, to which m belongs, is dominated, the map function is finished.

Here, "M" is a mark to indicate that the corresponding tuple is a midpoint of a certain tuple. That is, "M" is a midpoint mark. Although the mark "M" is used for convenience, marks other than "M" may be used as the midpoint mark.

Next, it is determined to which leaf node of the reverse sky quad tree the tuple t belongs (SR216), and if the leaf node is marked as being dominated (SR217), the map function is finished. If the leaf node is not dominated, ID of the leaf node and ("P", contents of the tuple t) are output as a key and a value, respectively (SR218).

Here, "P" is a mark to indicate that the tuple is the original tuple stored in the database, and not the midpoint-type tuple. That is, "P" is a midpoint mark. Although the mark "P" is used for convenience, marks other than "P" may be used as the midpoint mark.

Figure 19:
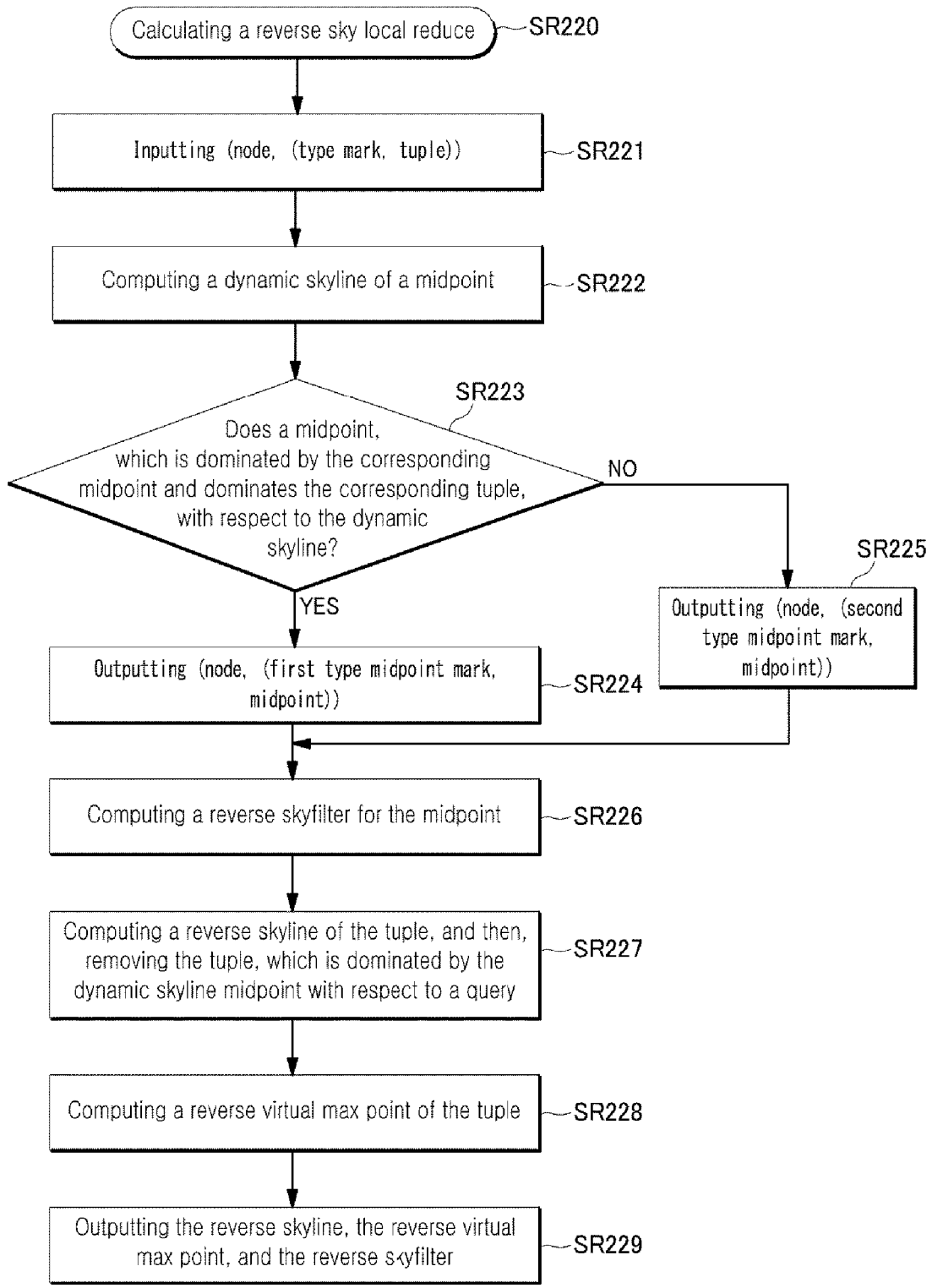
FIG. 19 illustrates flow of a local reduce calculating phase for a reverse skyline query in accordance with an example embodiment.

FIG. 19 illustrates flow of a local reduce calculating phase (SR220) for a reverse skyline query in accordance with an example embodiment.

(Node, tuple) is input (SR221).

A dynamic skyline for a query of a midpoint is computed (SR222).

If each midpoint belonging to a midpoint list is a midpoint, which is dominated by a midpoint belonging to the computed dynamic skyline, while dominating a tuple of the corresponding midpoint (SR223), (node, (first type midpoint mark, midpoint)) is output (SR224), and otherwise, (node, (second type midpoint mark, midpoint)) is output (SR225).

A reverse skyfilter is computed (SR226).

After the reverse skyline is computed, the tuple dynamically dominated by the midpoint with respect to the query is removed (SR227).

A reverse virtual max point is computed (SR228).

The computed reverse skyline, reverse virtual max point, and reverse skyfilter are output (SR229).

The MapReduce framework, which is the base of the example embodiment, forms a list of tuples belonging to nodes based on their respect node ID, through a shuffling process, which is automatically executed between the local map calculating phase (SR210) implemented by at least one first map function and the global reduce calculating phase (SR220) implemented by at least one first reduce function. This list includes a list of tuples marked with "P" and a midpoint marked with "M."

In this regard, to describe the flow of the local reduce calculating phase (SR220) once again, the reduce function takes a key-value pair having an ID of a node as a key and a list of tuples belonging to the node as a value (SR221).

Next, a dynamic skyline for a query point q of a midpoint is searched in the list of midpoints (SSR222).

When the computed dynamic skyline midpoint m is a midpoint of a tuple t, it is determined whether there is the case where the list of midpoints includes another midpoint m" dynamically dominated by the midpoint m with respect to q, and m" dynamically dominates t with respect to q (S4223).

If such a case exists, the dynamic skyline midpoint m is output with the node ID, which has been taken as input, as a key and ("V", midpoint m) as a value (SR224). If such a case does not exist, the dynamic skyline midpoint m is output with the node ID, which has been taken as input, as a key and ("M", midpoint m) as a value (SR225).

Here, "M", which has been used as the midpoint type mark, is identically used as the first type midpoint mark, but marks other than "M" may be used as the first type midpoint mark. In addition, marking "V" is intended for utilization when calculating a global reverse skyline. That is, "V" is the second type midpoint mark. Although the mark "V" is used for convenience, marks other than "V" may be used as the second type midpoint mark.

Similar to the processing of the skyline query, among dynamic skyline midpoints m in at least one dimension k, a set of midpoints having a minimum value of $|m(k)-q(k)|$ is made and called a reverse skyfilter of a node n (SR226).

Next, a reverse skyline for a query point q is searched with tuples marked with "P," and the computed reverse skyline is purified (SR227). It is determined whether each of the computed reverse skyline tuples t is dynamically dominated by the dynamic skyline midpoint with respect to q. In this case, if the dynamic skyline midpoint has been a midpoint of the tuple t, the dominance relationship is not determined. If the reverse skyline tuple is dynamically dominated by the midpoint with respect to q, the tuple cannot be the global reverse skyline tuple, and thus, is removed from the reverse skyline.

For each of the dimensions k, a ($=|t(k)-q(k)|$) tuple, which has a maximum value of an absolute value of a difference between a k-dimensional value of the reverse skyline tuple t, which has not been removed, and a k-dimensional value of the query point q as a k-dimensional value, is generated. The generated virtual tuple is referred-to as a reverse virtual max point (SR228).

The reverse skyline tuple t that has not been removed is output with the node ID, which has been taken as input, as a key and ("P", t) as a value, and the reverse skyfilter and the reverse virtual max point are stored in the distributed file system (SR229).

Figure 20:
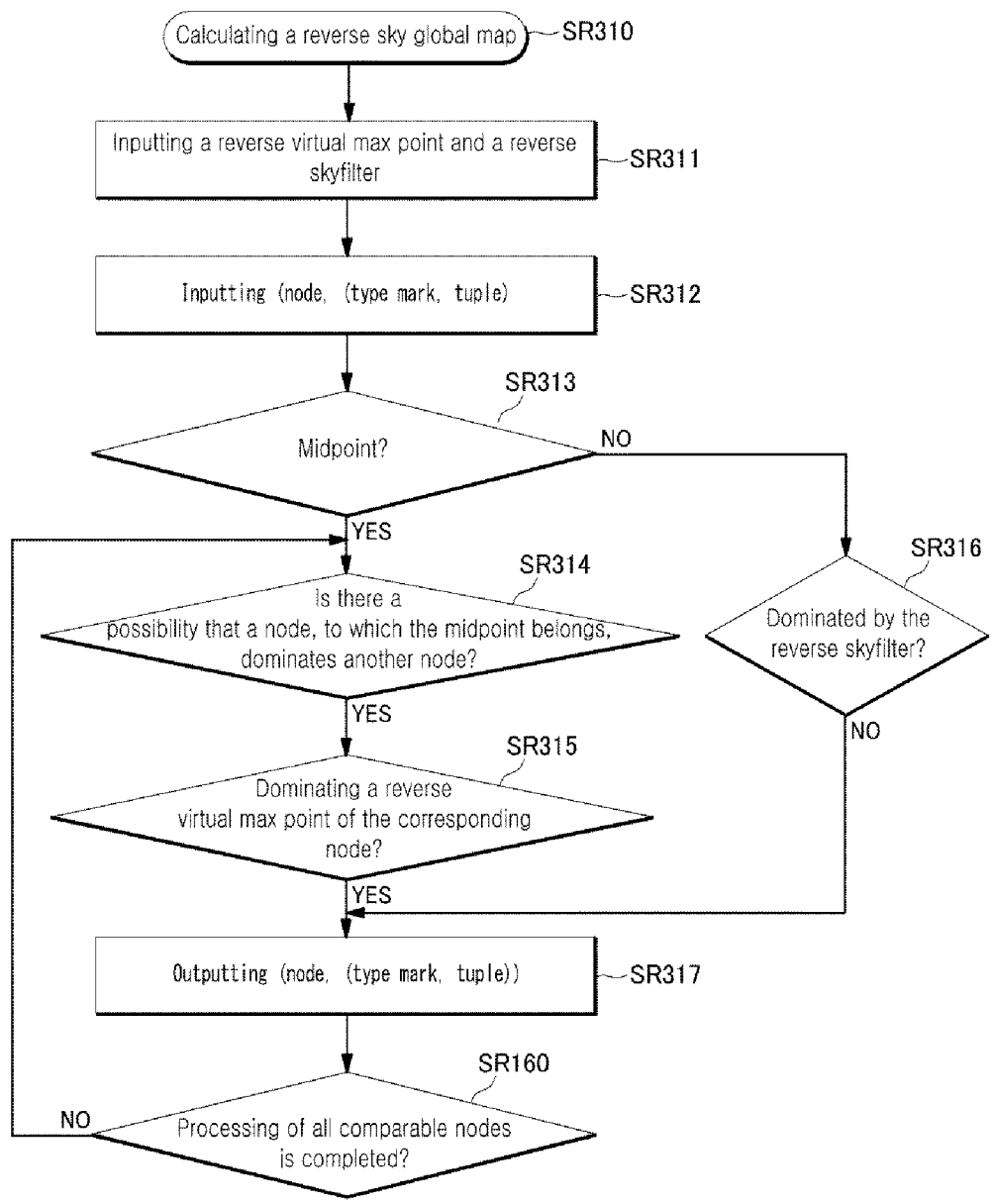
FIG. 20 illustrates flow of a global map calculating phase for a reverse skyline query in accordance with an example embodiment.

FIG. 20 illustrates flow of a global map calculating phase (SR310) for a reverse skyline query in accordance with an example embodiment (SR310).

A reverse virtual max point and a reverse skyfilter are input (SR311).

In addition, (node, (type mark, tuple) is input (SR312).

In case of the midpoint-type tuple (SR313), until processing of all comparable nodes is completed (SR318), there is the possibility that a node, to which the midpoint belongs, dominates another node (SR314), and if the reverse virtual max point of the corresponding node is dominated (SR315), (node, (type mark, tuple)) is output (SR317).

In case of the tuple-type tuple (SR313), if the node is not dominated by the reverse skyfilter (SR316), (node, (type mark, tuple)) is output (SR317).

In this regard, to describe the flow of the global map calculating phase (SR310) once again, in the global reverse skyline process, a reverse skyline for all data is actually searched by comparison with other tuples, which are not included in a leaf node.

First, the reverse skyfilters and the reverse virtual max point are broadcasted to all map functions (SR311). The map function takes, as input, a mark indicating a type of a tuple and a key-value pair having a tuple as a value and an ID of a node, to which the tuple belongs, as a key (SR312). This tuple is a tuple originally present in a database or a midpoint of a tuple present in a database.

Accordingly, the map function first determines whether an input tuple is a midpoint or not (SR313). Since a midpoint in the previous phase is marked with "V" or "M," and the other tuples are marked with "P," they can be easily discriminated.

First, if an input tuple is a midpoint, the midpoint is compared with ID of a node including the midpoint based on a list of all non-empty and non-dominated leaf nodes. When the node including the midpoint is n, and another node is o, only if n may dominate o (SR314), a reverse virtual max value of o and the midpoint m are compared with each other. Only if the midpoint m dominates the reverse virtual max value of o (SR325), a key-value pair is output (SR317). In the key-value pair to be output, the key is ID of m, and the value is ("V", midpoint m) if the midpoint m has been marked with "V," and ("M", midpoint m) if the midpoint m has been marked with "M."

Next, if input of the map function is a tuple t, and not a midpoint, it is first determined whether the tuple t is dynamically dominated by a reverse skyfilter tuple with respect to q (SR316). If the tuple t is dynamically dominated, the tuple t cannot be a reverse skyline, and thus, is not output. If the tuple t is not dynamically dominated, the tuple t is output as input (SR317).

Figure 21:
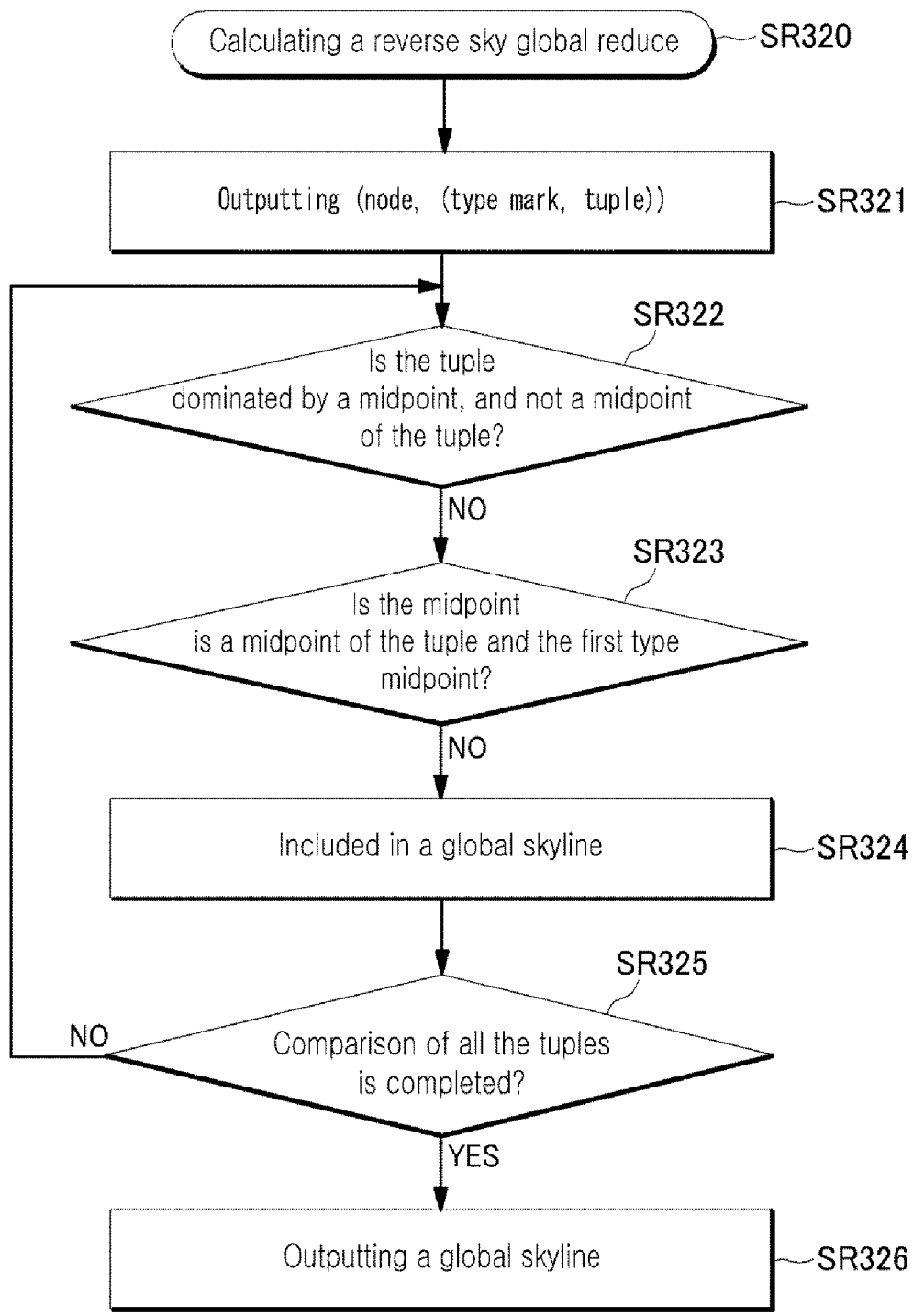
FIG. 21 illustrates flow of a global reduce calculating phase for a reverse skyline query in accordance with an example embodiment.

FIG. 21 illustrates flow of a global reduce calculating phase (SR320) for a reverse skyline query in accordance with an example embodiment.

(Node, (type mark, tuple)) is input (SR321).

Until comparison of all tuples is completed (SR325), the tuple-type tuple is not dominated by a midpoint-type tuple, which is not a midpoint of the tuple-type tuple (SR322), and only if the midpoint-type tuple is a midpoint of the tuple-type tuple and is not the first type midpoint tuple (SR323), it is included in a global reverse skyline (SR324).

The computed global reverse skyline is output (SR326).

The MapReduce framework, which is the base of the example embodiment, generates a list of tuples having the same node ID as a key and invokes a reduce function, through a shuffling process, which is automatically executed between the global map calculating phase (SR310) implemented by at least one second map function and the global reduce calculating phase (SR320) implemented by at least one second reduce function.

In this regard, to describe the flow of the global reverse reduce calculating phase (SR320) once again, the reduce function takes a list of tuples having the same node ID as a key as input (SR321). The list of the tuples consists of midpoints marked with "M" or "V" and tuples marked with "P."

The reduce function identifies whether the tuple t marked with "P" is dynamically dominated by the midpoint m marked with "M" or "V" with respect to the query point q (SR322). In this case, if the midpoint m is a midpoint of the tuple t, the dominance relationship is not determined, and it is determined whether the midpoint m is marked with "V" (SR323). If the midpoint m is marked with "V," the tuple t cannot be a reverse skyline, and thus, is removed. If the tuple t is dynamically dominated by the midpoint m, and not a midpoint of the tuple t, the tuple t cannot also be a reverse skyline, and thus, is removed.

Since all the tuples marked with "P," which have not been removed, are global reverse skyline tuples, they are output (SR324).

Once the comparison of all the tuples is completed (SR325), the tuples, which have not been removed, and thus, are included in the reverse skyline, are output as a resulting product of the reverse skyline query (SR326).

In order to verify the performance of the skyline query system 10 in accordance with the example embodiment, three (3) types of synthetic data, i.e., independent, correlated, and anti-correlated data, were generated as experimental data according to the data synthesis method in the Stephan Borzsonyi's paper, "The Skyline Operator (ICDE01)," which is frequently used to evaluate skyline calculation algorithms, by varying the number of tuples from $10^7$ to $4*10^9$.

For comparison with an existing method, a PPPS-MR algorithm (hereinafter, Conventional 1) was produced by converting the PPPS algorithm, which was proposed in the Henning Kohler's paper, "Efficient parallel skyline processing using hyperplane projections (SIGMOD11)," to be suitable for the MapReduce.

In addition, the two (2) algorithms proposed in the Foto Afrati's paper "Parallel Skyline queries (ICDT12)" were converted to be suitable for the MapReduce, and referred-to as GRID-MR-1 and GRID-MR-2, respectively (hereinafter, Conventional 4 and Conventional 1, respectively).

The Boliang Zhang's paper, "Adapting Skyline Computation to the MapReduce Framework: Algorithms and Experiments" proposed the MR-BNL skyline query algorithm utilizing the MapReduce, and the algorithm was identically used herein (hereinafter, Conventional 3).

Figure 22A:
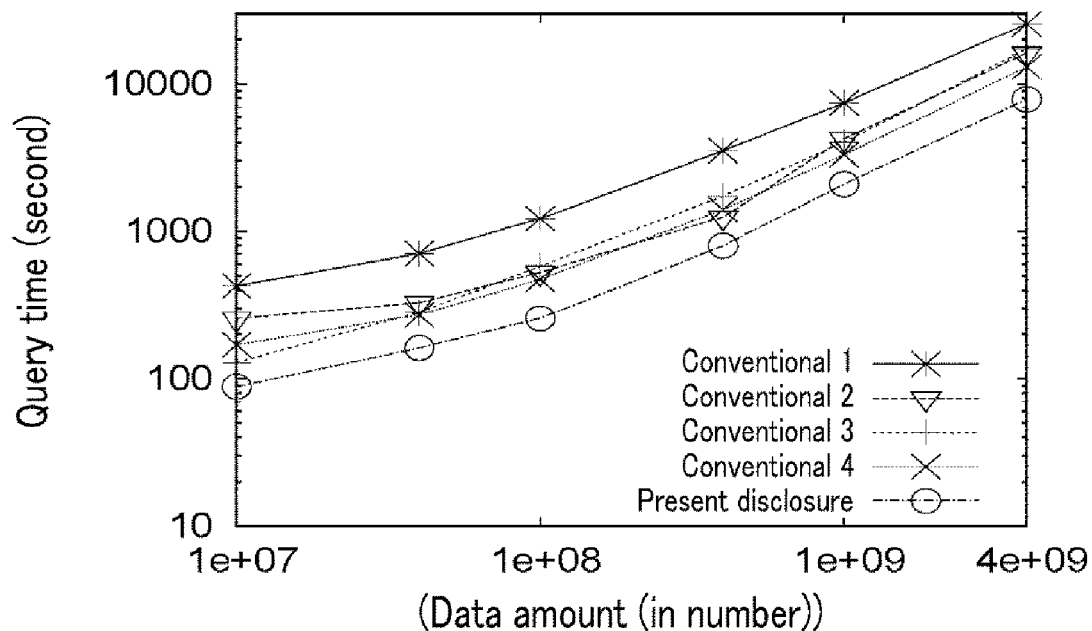
FIG. 22A to FIG. 22C illustrate comparison of the performance of the skyline query and the reverse skyline query in accordance with the example embodiments with conventional technologies.
Figure 22B:
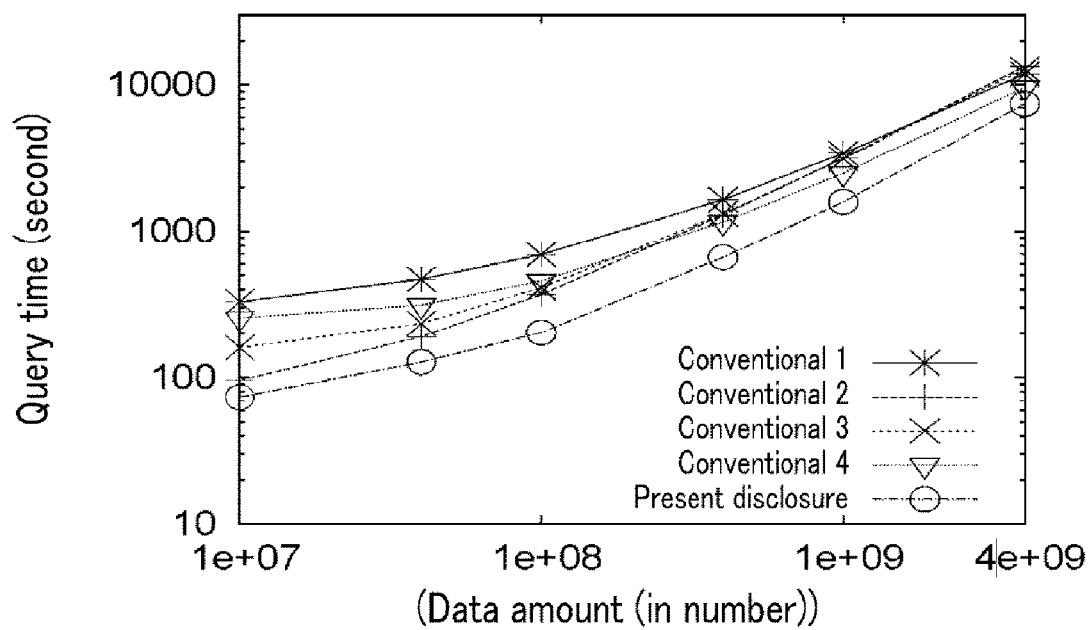
Figure 22C:
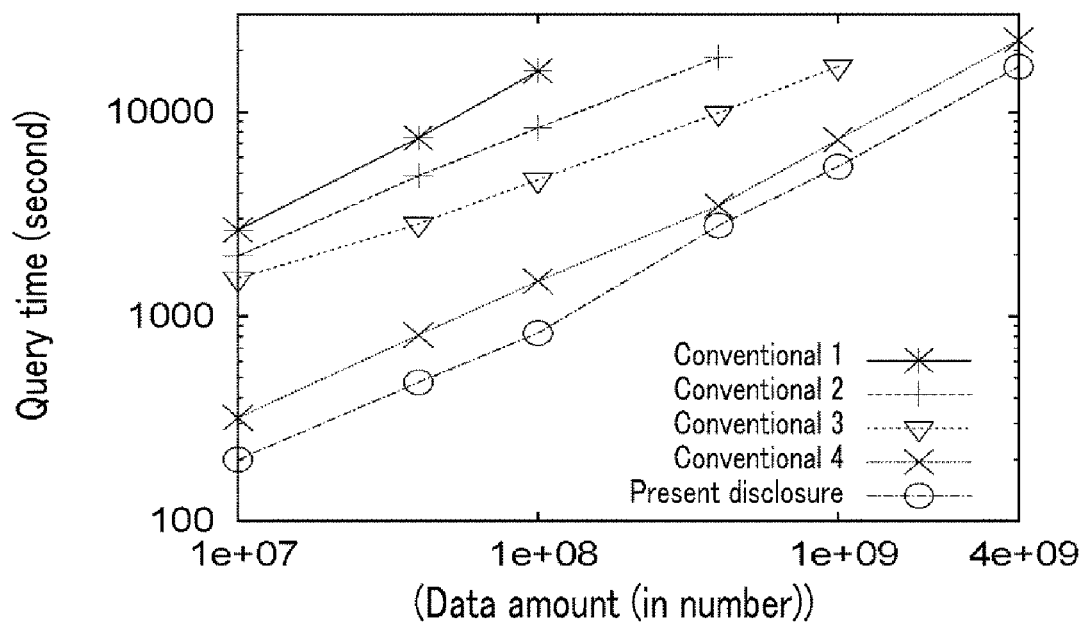

FIG. 22A to FIG. 22C illustrate comparison of performance of the skyline query calculating method and the reverse skyline query calculating method in accordance with the example embodiment with conventional technologies.

With respect to the synthetic data, the skyline query calculating method proposed in the example embodiment and the query implementation time in the conventional technologies are illustrated in FIG. 22A to FIG. 22C while changing the number of tuples. The drawings in FIG. 22A to FIG. 22C show skyline query time for independent data, skyline query time for correlated data, and skyline query time for anti-correlated data, respectively. It is identified that the example embodiment has better performance than that of the conventional technologies in all the cases.

Figure 23A:
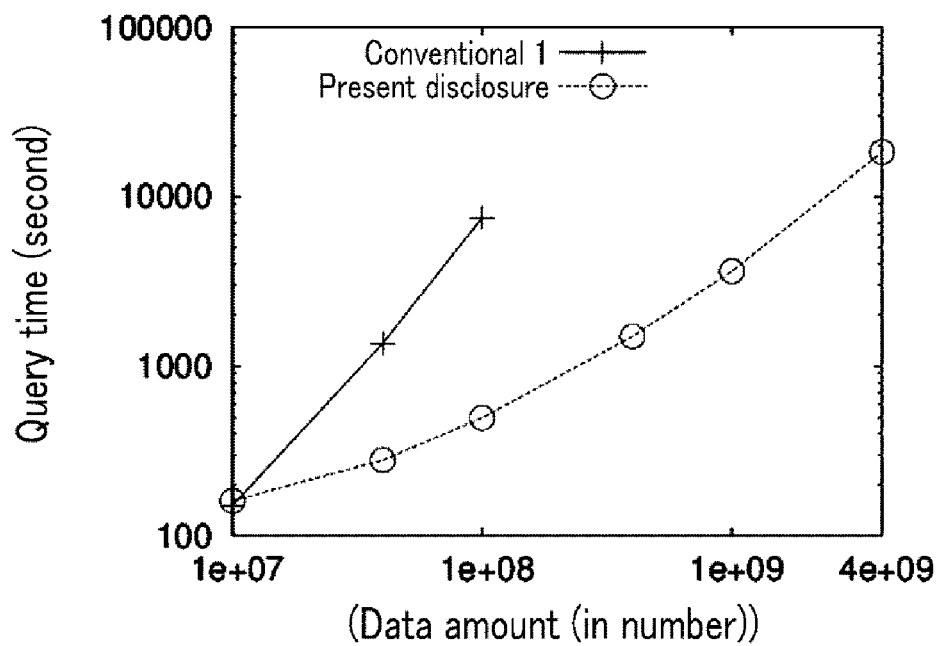
FIG. 23A to FIG. 23C illustrate comparison of the performance of the skyline query and the reverse skyline query in accordance with the example embodiments with conventional technologies.
Figure 23B:
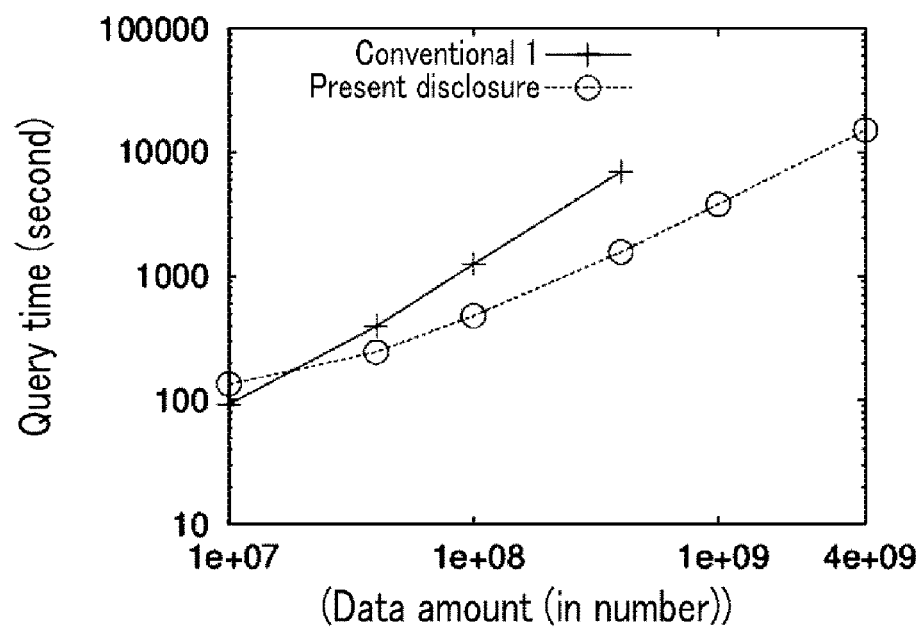
Figure 23C:
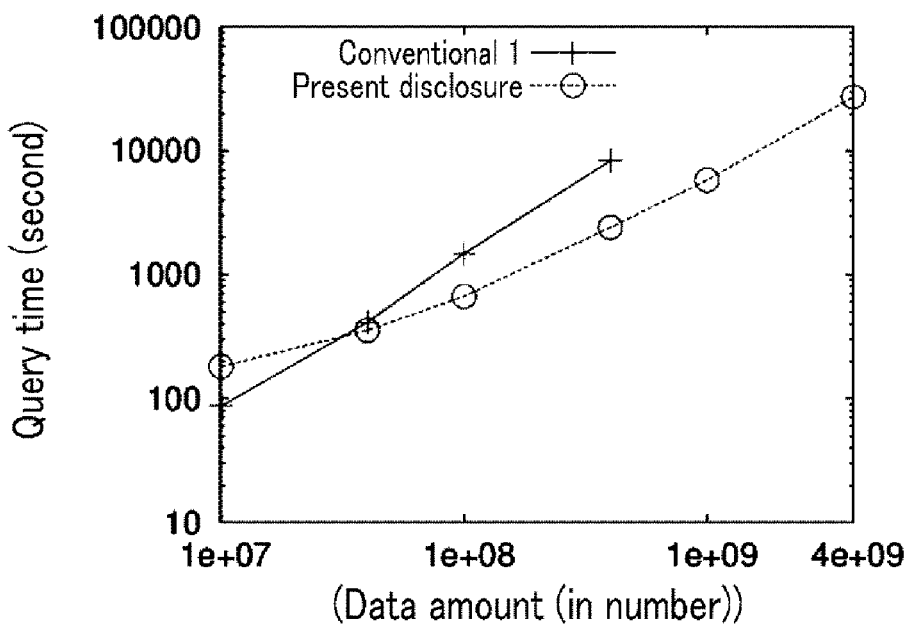

FIG. 23A to FIG. 23C illustrate comparison of performance of the skyline query calculating method and the reverse skyline query calculating method in accordance with the example embodiment with conventional technologies.

In addition, for comparison of the reverse skyline calculation performance, the BR-RSKY-MR algorithm (Conventional 1), which divides orthants with respect to a query point and calculates a reverse skyline of each of the orthants, and the reverse skyline query calculating method of the example embodiment are illustrated in FIG. 23A to FIG. 23C. The drawings in FIG. 23A to FIG. 23C show reverse skyline query time for independent data, reverse skyline query time for correlated data, and reverse skyline query time for anti-correlated data, respectively. It is identified that the example embodiment has better performance than that of the conventional technology in all the cases.

The illustrative embodiments can be embodied in a storage medium including instruction codes executable by a computer or processor such as a program module executed by the computer or processor. A data structure in accordance with the illustrative embodiments can be stored in the storage medium executable by the computer or processor. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The skyline query system and method in accordance with the present disclosure can be implemented by a computer-readable code in a computer-readable storage medium. The computer-readable storage medium includes all kinds of storage media in which computer-readable data are stored and may include, for example, a ROM (Read Only Memory), a RAM (Random Access Memory), a magnetic tape, a magnetic disc, a flash memory, an optical data storage device, etc. Further, the computer-readable storage medium can be distributed in a computer system connected via a computer communication network and can be stored and executed as a code that is readable in a distribution manner.

The device and method of the present disclosure has been explained in relation to a specific embodiment, but its components or a part or all of its operation can be embodied by using a computer system having general-purpose hardware architecture can be applied.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A skyline query apparatus for performing a skyline query, the apparatus comprising a processor configured to:
   determine a type of the skyline query, the type including a normal skyline query, a dynamic skyline query, or a reverse skyline query;
   generate a quad tree from data, the quad tree including plural tuples in plural leaf nodes;
   determine whether a first tuple p dominates other tuples of the plural tuples, the plural tuples including the first tuple p, based on the determined type of the skyline query,
      wherein, in response to the type of the skyline query being determined to be the normal skyline query, the processor is further configured to determine that the first tuple p dominates a second tuple r of the other tuples when $p(k) \leq r(k)$ holds for every dimension k and $p(j)<r(j)$ holds for at least one dimension j, and
      wherein the tuple p and the tuple r, respectively included in the data and having a d-dimensional value, are represented by $<p(1), p(2), \ldots, p(d)>$, and $<r(1), r(2), \ldots, r(d)>$, respectively;
   determine which leaf node, from among the plural leaf nodes, includes the tuple p that is determined to dominate the other tuples, and mark a corresponding leaf node, which cannot comprise a local skyline, as being dominated, based on a result of the determining which leaf node includes the tuple p that is determined to dominate the tuple r;
   identify a local skyline of each leaf node, which is not marked as being dominated, from among the plural leaf nodes in the sky quad tree, and identify a global skyline by using the local skyline by excluding tuples, from among the plural tuples, which are dominated by the other tuples, wherein the global skyline corresponds to a set of all tuples which are not dominated by any other tuples;
   perform the skyline query, according to the determined type of the skyline query, based on the identified local skyline and global skyline, in parallel using a MapReduce framework.

2. The skyline query apparatus for performing a skyline query of claim 1,
   wherein the skyline query apparatus is a distributed apparatus comprising at least one computer node, and further comprises at least one data storage unit for storing the data.

3. The skyline query apparatus for performing a skyline query of claim 1, wherein the data comprise at least one attribute having ordered values, and
   the processor is further configured to determine a leaf node of the quad tree, to which the data will belong, by splitting a space, which has the number of the attributes of the data indicated by the criteria contained in the skyline query as a dimension, once or more according to location of points represented by the data in the space.

4. The skyline query apparatus for performing a skyline query of claim 3, wherein the processor is further configured to assign a fixed ID to each of the split spaces for every space split according to a location of each of the split spaces in the space prior to the split, and connects an ID of the space prior to the split and an ID of the split spaces to determine an ID of a node of a quad tree represented by the split spaces.

5. The skyline query apparatus for performing a skyline query of claim 3, wherein the processor is further configured to assign a bit string, which has the same length as the dimension of the space, as an ID of each of the split spaces.

6. The skyline query apparatus for performing a skyline query of claim 3, wherein a leaf node of the quad tree comprises data, which are smaller than or the same in number as a split threshold.

7. The skyline query apparatus for performing a skyline query of claim 3, wherein in response to the type of the skyline query being determined to be the dynamic skyline query or the reverse skyline query, the processor is further configured to use a midpoint between a point represented by the skyline query and a point represented by the data in the space when generating the quad tree.

8. The skyline query apparatus for performing a skyline query of claim 3, wherein in response to the type of the skyline query being determined to be the reverse skyline query, the processor is further configured to generate a quad tree for each of spaces split based on the point represented by the skyline query.

9. The skyline query apparatus for performing a skyline query of claim 1, wherein the processor is further configured to generate the quad tree by using only parts of the data.

10. The skyline query apparatus for performing a skyline query of claim 1, wherein the processor is further configured to determine a dominance relationship of nodes based on an ID of nodes of the quad tree.

11. The skyline query apparatus for performing a skyline query of claim 10, wherein the processor is further configured to determine whether a leaf node dominates another leaf node, by computing at least one bit string by dividing an ID of a leaf node of the quad tree by dimensions, and comparing the bit string of the leaf node and the corresponding bit string of another leaf node.

12. The skyline query apparatus for performing a skyline query of claim 1, wherein the processor is further configured to identify the global skyline using statistical information.

13. The skyline query apparatus for performing a skyline query of claim 1, wherein the processor is further configured to compute:
   a virtual max point, which is virtual data constructed by using maximum values extracted in the data contained in the local skyline when compared with other data by attributes, and
   a skyfilter, which is a set of data where at least one attribute is a minimum value when compared with other data among the data contained in the local skyline.

14. A method of performing a skyline query by using a skyline query apparatus constructed in a distributed environment, the method comprising:
   determining, by a processor of the skyline query apparatus, a type of the skyline query, the type including a normal skyline query, a dynamic skyline query, or a reverse skyline query;
   generating, by the processor, a quad tree from data, the quad tree including plural tuples in plural leaf nodes;
   determining, by the processor, whether a first tuple p dominates other tuples of the plural tuples, the plural tuples including the first tuple p, based on the determined type of the skyline query, wherein, in response to the type of the skyline query being determined to be the normal skyline query, the method further comprises determining, by the processor, that the first tuple p dominates a second tuple r of the other tuples when $p(k) \leq r(k)$ holds for every dimension k and $p(j)<r(j)$ holds for at least one dimension j, and wherein the tuple p and the tuple r, respectively included in the data and having a d-dimensional value, are represented by $<p(1), p(2), \ldots, p(d)>$, and $<r(1), r(2), \ldots, r(d)>$, respectively;

determining, by the processor, which leaf node, from among the plural leaf nodes, includes the tuple p that is determined to dominate the other tuples;

marking, by the processor, a corresponding leaf node, which cannot comprise a local skyline, as being dominated, based on a result of the determining which leaf node includes the tuple p that is determined to dominate the tuple r;

identifying, by the processor, a local skyline of each leaf node, which is not marked as being dominated, from among the plural leaf nodes in the sky quad tree, and identifying, by the processor, a global skyline using the local skyline by excluding tuples, from among the plural tuples, which are dominated by the other tuples, wherein the global skyline corresponds to a set of all tuples which are not dominated by any other tuples;

performing, by the processor, the skyline query according to the determined type of the skyline query, based on the identified local skyline and global skyline, in parallel using a MapReduce framework.

15. The method for implementing a skyline query of claim 14, wherein the data comprise at least one attribute having ordered values, the processor determines a leaf node of the quad tree, to which the data will belong, by splitting a space, which has the number of the attributes of the data indicated by the criteria contained in the skyline query as a dimension, once or more according to location of points represented by the data in the space, and the leaf node of the quad tree comprises data, which are smaller than or the same in number as a split threshold.

16. The method for implementing a skyline query of claim 15, wherein the processor assigns a fixed ID to each of the split spaces for every space split according to location of each of the split spaces in the space prior to the split, and connects an ID of the space prior to the split and an ID of the split spaces to determine an ID of a node of a quad tree represented by the split spaces, and assigns a bit string, which has the same length as the dimension of the space, as an ID of each of the split spaces.

17. The method for implementing a skyline query of claim 15, wherein in response to the skyline query being determined to be the dynamic skyline or the reverse skyline, the processor is further configured to use a midpoint between a point represented by the skyline query and a point represented by the data in the space when generating the quad tree.

18. The method for implementing a skyline query of claim 15, wherein in response to the skyline query being determined to be the reverse skyline, the processor generates a quad tree for each of spaces split based on the point represented by the skyline query.

* * * * *